(12) United States Patent
Roy et al.

(10) Patent No.: US 8,738,715 B2
(45) Date of Patent: May 27, 2014

(54) SYSTEM AND METHOD FOR PROCESSING MESSAGES IN A MESSAGING SERVICE

(75) Inventors: Warren Roy, Vancouver (CA); Colin Shong Chin Quon, Vancouver (CA); Michael Edward Sample, North Vancouver (CA)

(73) Assignee: Global Relay Communications Inc., Vancouver, British Columbia (CA)

( * ) Notice: Subject to any disclaimer, the term of this patent is extended or adjusted under 35 U.S.C. 154(b) by 227 days.

(21) Appl. No.: 13/363,351

(22) Filed: Jan. 31, 2012

(65) Prior Publication Data

US 2013/0198296 A1  Aug. 1, 2013

(51) Int. Cl.
 *G06F 15/16* (2006.01)
(52) U.S. Cl.
 USPC .......................................... 709/206
(58) Field of Classification Search
 USPC ........... 709/204–207, 225, 227–229
 See application file for complete search history.

(56) References Cited

U.S. PATENT DOCUMENTS

| | | | |
|---|---|---|---|
| 6,772,195 B1* | 8/2004 | Hatlelid et al. | 709/204 |
| 7,519,730 B2 | 4/2009 | Bailey et al. | |
| 2010/0029312 A1 | 2/2010 | Smith et al. | |
| 2011/0151890 A1 | 6/2011 | Platt et al. | |
| 2011/0153750 A1 | 6/2011 | Sanchez | |
| 2012/0088527 A1* | 4/2012 | Roka | 455/466 |
| 2012/0110092 A1* | 5/2012 | Keohane et al. | 709/206 |
| 2013/0198296 A1* | 8/2013 | Roy et al. | 709/206 |

* cited by examiner

*Primary Examiner* — Brendan Higa
(74) *Attorney, Agent, or Firm* — McCarthy Tétrault LLP

(57) ABSTRACT

A method, system and server for processing messages sent from a client in a network are provided. The method comprises: for a message for a conversation to be transmitted from a client associated with a first user account associated with the network to a set of user accounts, upon activation of a command to send the message, sending to the set of accounts a request message requesting acceptance of the conversation; receiving replies from the set of accounts to the request message; and sending the message for the conversation to a first subset of accounts associated with the set of accounts that generated an acceptance message for the request message and updating a message log associated with the conversation to indicate that the first subset of accounts has accepted the conversation as participants in the conversation. A method, system and server for message archiving are also provided.

20 Claims, 12 Drawing Sheets

SYSTEM AND METHOD FOR PROCESSING MESSAGES IN A MESSAGING SERVICE

FIELD OF THE DISCLOSURE

The present disclosure relates to the field of messaging systems and methods. In particular, the disclosure relates to one-to-one, multi-user, broadcast and persistent chat messaging systems and methods having tracking and records facilities useful in managing communications in regulated industries, such as financial services industries.

DESCRIPTION OF THE BACKGROUND

Business enterprises use real-time messaging communication systems to collaborate with partners and connect with clients. Enterprises often use various different consumer services, such as MSN, Yahoo, AIM/ICQ and Skype (all trade-marks), as part of their network messaging tools. While use of consumer-oriented technologies in an enterprise can lead to substantial productivity gains and certain cost savings, such technologies do not provide adequate controls that comply with regulatory requirements.

Larger enterprises typically deploy integrated solutions using commercial messaging platforms, such as Microsoft Lync/OCS/LCS, IBM/Lotus Sametime and Cisco Quad (all trade-marks), and hosted services, such as Salesforce Chatter (trade-mark). These communications platforms are costly and highly complex to integrate with existing systems and processes. With such solutions, user communications are typically confined to be within the enterprise.

Regulatory requirements for electronic messaging involve record keeping, messaging supervision, and support for audits and eDiscovery. In the United States, the Security Exchange Commission (SEC) has several rules governing books and records that are to be maintained by advisors, brokers and others, including Rule 204-2, Rules 17a-3 and 17a-4, Rule 3110 and Rule 206(4)-7. The Financial Industry Regulatory Association (FINRA) has rules as well, including Regulatory Notice 07-59, covering messaging supervision for broker-dealers. Current message systems have inherent deficiencies in meeting regulatory compliance requirements.

SUMMARY OF THE DISCLOSURE

In a first aspect, a method for processing messages sent from a client in a network is provided. The method comprises: for a message for a conversation to be transmitted from a client associated with a first user account of a plurality of user accounts associated with the network to a set of user accounts of the plurality of user accounts, upon activation of a command to send the message, sending to the set of user accounts a request message requesting acceptance of the conversation; receiving replies from the set of user accounts to the request message; and providing the message for the conversation to a first subset of accounts associated with the set of user accounts that generated an acceptance message for the request message and updating a message log associated with the conversation to indicate that the first subset of accounts has accepted the conversation as participants in the conversation.

The method may further comprise not providing the message to a second subset of accounts associated with the set of user accounts that refused or did not respond to the request message and updating the conversation log to indicate that the second subset of accounts has not been sent message for the conversation.

The method may further comprise associating a message thread with the message for the conversation and the participants, where responses to the message from the participants are included in the message thread.

The method may further comprise closing the message thread when one of the participants indicates that it is no longer participating in the message thread; and creating a new message thread for a set of remaining participants in the conversation.

The method may further comprise initiating a new message thread associated with the conversation when one participant of the participants forwards a message in the conversation to a new user account of the plurality of user accounts that is not a participant of the conversation, the new message thread including the new user account; and initiating a new message thread associated with the conversation when one participant leave the conversation.

The method may further comprise assigning the first user account with a moderator role, having authority to end the conversation, remove a participant from the conversation and change the role of another participant in the conversation.

The method may further comprise assigning an account of a participant of the participants as a ghost reviewer, having authority to revoke the moderator role from the first user account and to send a warning message to any of the participants determined to have a compliance violation.

The method may further comprise assigning an account of a participant of the participants with a member role having authority to at least write messages, change thread subject, transfer conversations and hold and resume conversations.

The method may further comprise assigning an account of a participant of the participants with a viewer role, having viewing restrictions on at least one or more of messages, lists of participants, and a message thread history.

The method may further comprise assigning an account of a participant of the participants identified in a "send to" field for the conversation as an contributor to the message thread; assigning an account of a participant of the participants identified in a "send cc" field for the conversation as a passive contributor to the message thread; and assigning an account of a participant of the participants identified in a "send bcc" field for the conversation as an invisible contributor to the message thread that cannot invite or initiate sending of blind copy of a message to other user accounts to the conversation.

The method may further comprise closing the message thread and ending the conversation when either a command to end the conversation is issued by the first user or all participants have left the conversation.

The method may further comprise transferring the conversation to an account of the plurality of user accounts outside the participants upon issuance of a transfer command from the first user account.

The method may further comprise any of: placing a hold on the message thread upon issuance of a hold command from the first user account, where new messages cannot be submitted to the message thread until the hold is removed; interrupting the message thread upon issuance of a mark command from the first user account, where a new message from the first user account is provided at the mark point in the message thread; seizing the message thread upon issuance of a seize command from the first user account, where the participants having only viewer role until the seized message thread is released by the first user account; merging the message thread with a second message thread of a second conversation into a third message thread for a third conversation involving participants of the first and second conversations; and splitting the conversation into first and second parts with a first subset of the participants assigned to the first part and a second subset of the participants assigned to the second part.

The method may further comprise for each account of the first subset of accounts, maintaining message status data relating to the each account and updating the message status data to indicate whether the message has been: received by the network; received by the each account; and opened by the each account.

The method may further comprise tracking the conversation in a conversation channel, the conversation channel being discoverable by one of the plurality of accounts.

The method may further comprise specifying a time-to-live time for the conversation indicating a deadline for acceptance of the request message. If an account of the first subset of accounts accepts the message prior to the time-to-live time, the account may be designated as a participant in the conversation; and if the account accepts the message after the time-to-live time, the account may not be permitted to participate in the conversation.

The method may further comprise providing the message to the participants as either a one-to-one conversation, a multi-party conversations, a blast conversations or a broadcast conversations.

The method may further comprise providing access to the first user account through a second client in the network while maintaining access to the first user account through the first client; when the second client reconnects to the network after being disconnected from the network, reconciling any queued actions for the conversation, the message thread and the messages stored at the second client against a current state of the conversation, the message thread and the messages; re-synchronizing the second client to the current state of the message conversation, the message thread and the messages; updating a first status indicator in the message log with details whether the message has been sent from the second client; and updating a second status indicator in the message log with details whether the message has been received or opened by the second client. The second client may be a mobile device.

The method may further comprise forwarding the message to an outside account of the plurality of accounts that is not in the first subset of accounts while a shared conversation status is maintained for the outside account. The outside account may be a contact in a roster associated with the first user account; and messages within the conversation submitted by outside user account may be formatted to appear to be submitted by the first user account or by the outside account on behalf of first user account.

In a second aspect, a server for processing messages sent from a client in a network is provided. The server comprises a message sending module. The message sending module is adapted to send a message for a conversation to be transmitted from a client associated with a first user account of a plurality of user accounts associated with the network to a set of user accounts of the plurality of user accounts upon activation of a command to send the message; send to the set of user accounts a request message requesting acceptance of the conversation; receive replies from the set of user accounts to the request message; and send the message for the conversation to a first subset of accounts associated with the set of user accounts that generated an acceptance message for the request message and updating a message log associated with the conversation to indicate that the first subset of accounts has accepted the conversation as participants in the conversation. The message sending module does not provide the message to a second subset of accounts associated with the set of user accounts that refused or did not respond to the request message and updating the conversation log to indicate that the second subset of accounts has not been sent message for the conversation; associates a message thread with the message for the conversation and the participants, where responses to the message from the participants are included in the message thread; closes the message thread when one of the participants indicates that it is no longer participating in the message thread; and creates a new message thread for a set of remaining participants in the conversation.

The server may further comprise a message archive server that assembles and stores data of an archive message unit for the conversation, the data comprising the message thread and messages associated with the conversation in a storage system. For the conversation, the data may comprise summary data, system header data and personal header data.

The message archive server may further update a message log associated with the conversation when the client accesses the data of the archive message unit.

A server and/or a device may be provided to implement any aspects of the method described.

In other aspects various combinations of sets and subsets of the above aspects are provided.

BRIEF DESCRIPTION OF THE DRAWINGS

Embodiments of the disclosure will now be described, by way of example only, with reference to the accompanying drawings, in which.

DETAILED DESCRIPTION OF EMBODIMENTS

Figure 1:
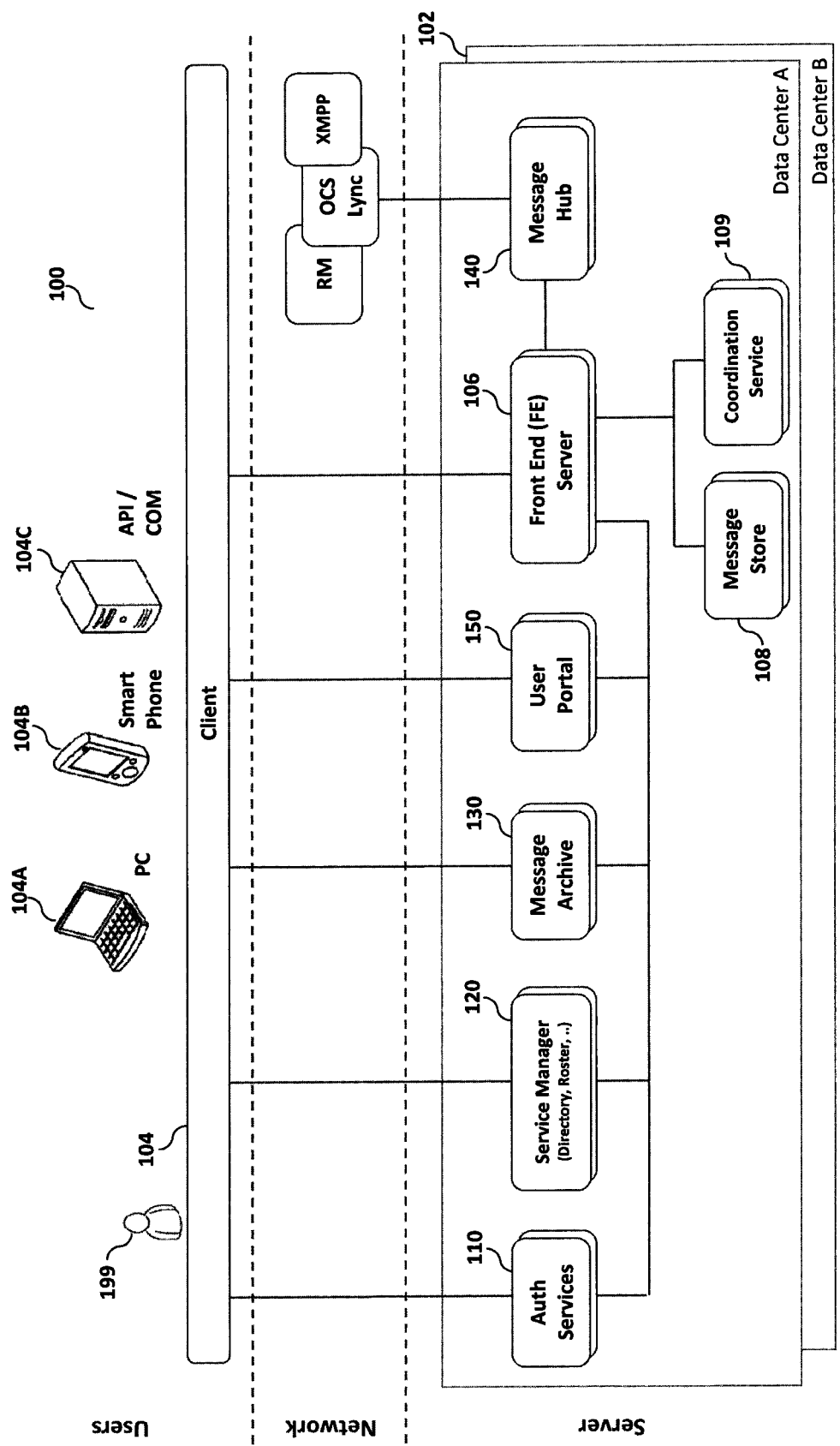
FIG. 1 is a block diagram of a network having a data center (as a server) accessed by a device (as a client) that is processing a message conversation according to an embodiment.

Exemplary details of embodiments are provided herein. The description which follows and the embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

One embodiment provides a messaging service. One feature of the embodiment provides a messaging system through a network that provides tracking of message histories. Messages are grouped together in a conversation. Entities that are involved in a conversation are provided in Table 1. As indicated in Table 1, users participate in conversations through clients that securely interface with the system. Conversations have clearly identified participants and are bundled in clearly demarcated threads which can be archived for compliance tracking. Features of the system provide secure, scalable and fault-tolerant messaging that allows adherence to regulatory requirements. Each user may be identified by a unique service identifier, which may be further associated with one or more aliases, which may include as an email address.

TABLE 1

Entities in a Conversation

| Entity | Description |
| --- | --- |
| User | Users creates, accepts, ignores conversations, starts and ends threads and sends messages |
| Client | Clients provide the user interface to the users and communicate with the system to send delivery receipts etc. |
| System | The system provides the messaging to the service clients. System components propagate conversation, threads, and messages amongst the participant users |

A message is an elemental communication tracked by an embodiment. A message is generated and sent by one client in the system to one or more clients in the system. Response message(s) can be provided to the original message. A series of messages may be linked together in a thread. A thread may be based on messages that have the same subject and/or set of participants. A series of threads and/or messages can be grouped together in a conversation. An embodiment provides tracking of messages, threads and conversations and their related participants. Control and archive features are provided for messages, threads and conversations and their related participants.

In one embodiment, the messaging service manages the distribution of the messages created by clients in a network, tracks message histories and participants in conversations, and provides controls over message participants. A client may be any type of device that can communicate with the network, such as a mobile device, computer, laptop, tablet device, a thick client, a thin client, a browser-based client, an application executing on a device, an embedded widget operating on a device, an autonomous client, a web robot ("BOT" or "bot"), etc.

At a client, graphical user interfaces (GUIs) may be provided to allow a user to access features of the service. For example, GUIs are provided for an inbox and a conversation interface. The inbox contains a list of active conversations; each conversation provides a set of individual threads which may be archived; and each thread contains the messages being exchanged. The embodiment also provides an archive system and a search interface to access active and archived messages.

Structural components of an embodiment and its features are now described in view of FIG. 1. An embodiment of the disclosed system and service is depicted by system 100. System 100 has data centers 102 which are geographically diverse and clients 104. Clients 104 may be provided in various application clients hosted on a variety of devices, such as desktop PC 104A, smartphone 104B, bots and third party servers 104C, for use by one or more users 199.

Data centers 102A and 102B are provided, each having system components having redundant IP, power and computing hardware. Clients 104 connect to the data centers 102 via secured IP data connections, where such connections are preferably optimized for bandwidth and battery consumption especially for carrier wireless data networks.

From the client 104, user 199 can initiate several types of messages, including messages based on one-to-one communications with one other participant, multi-user communications with multiple other participants, and blast and broadcast communications sending one communication broadcast from that one client to one or more other clients. The user may initiate and receive messages on one or more clients. A chat conversation provides instant messaging among clients where each chat session is tracked as a conversation. The client can also access other services through the system, such as directory services and message archive search.

Front end (FE) application servers 106 (herein "FE servers 106" or simply "servers 106") provide message application services, such as message processing and routing, presence, compliance logging and policy enforcement and event and status propagation. FE servers 106 connect to the message store system 108 and coordination service 109, via a plurality of Application Program Interfaces (APIs). Also, FE servers 106 connect via a plurality of APIs to authentication services 110, service manager server 120, message archive 130, and message hub server 140. Message store system 108 provides reliable, fault-tolerant and redundant storage of the active conversations and message inboxes. Coordination service server 109 monitors the operational health of FE servers 106 and provides an election service for load redistribution and service recovery in the event of a failure associated with an instance of FE server 106. For simplicity, other functional entities, such as content servers for file transfer and desktop sharing capabilities, and system management, maintenance and application administration, are not shown in FIG. 1.

Authentication server 110 provides a plurality of authentication services including user ID/password, Active Directory (trade-mark), and SAML authentication. Upon authenticating the user, authentication server 110 provides a service token to the authenticated client 104. The authenticated client then presents this service token to FE server 106 which then checks with authentication server 110 for service access authorization and user identity. Authentication server 110 also provides single sign-on as well as single sign-off services for all clients 104 and services associated with system 100.

Service manager server 120 provides the directory services that contain user profile and service data including information, such as vCards and line of report in organization. Service manager server 120 also provides the user contact roster for messaging for each user 199. Ethical wall policies are provided via rules that specify contacts that can be in a user's roster and contacts that a user is allowed to exchange messages. For simplicity, other service manager functions, such as service provisioning and user contact management, are not shown in FIG. 1.

Message archive server 130 provides reliable, fault-tolerant, redundant and compliant storage for conversations. It provides indexing and supports searches and retrieval of messages in the archive. Message archive server 130 also provides systems and routines for compliance review, audit and eDiscovery.

Message hub server 140 federates, mediates and provides messages and facilities to assist with processing and analyzing messages for compliance requirements between system 100 and external messaging services, such as Thomson Reuters (trade-mark) messaging for Reuters messaging users, enterprise or cloud hosted Microsoft LCS/OCS/Lync services for users and other messaging services, such as XMPP/Jabber. Message hub server 140 routes messages between the N message services with N routes that can be easily provisioned using DNS SRV records, instead of providing N routes to N other message services, which would require a total of N*(N−1) routes. Message hub server 140 provides high message transaction throughput and efficiently enables an industry-wide messaging service spanning the breadth of the financial services industry including banks, hedge funds and broker dealers as well as other firms in highly regulated industries, such as insurance and health care.

User portal server 150 generates and manages a user interface for end users to access and manage the user services, such as contact invitation and edit user profile. It also provides an interface for users to discover and securely access third party applications, such as trading bots. For simplicity, servers for other functions, such as service provisioning, service monitoring, service usage recording and billing and user contact invitation management, are omitted from FIG. 1.

Now further detail is provided on the message conversation user data model which is provided by an embodiment. For the conversations, an embodiment provides facilities to track and control conversation participants. Message tracking is used to facilitate compliance with regulatory requirements, such as requirements of the SEC and FINRA. Various levels of tracking and control are provided. One embodiment selectively imposes a requirement that a participant in a conversation must expressly agree to accept the conversation. This feature expressly restricts participants in a conversation which can facilitate management of the conversation and related messages.

Figure 2:
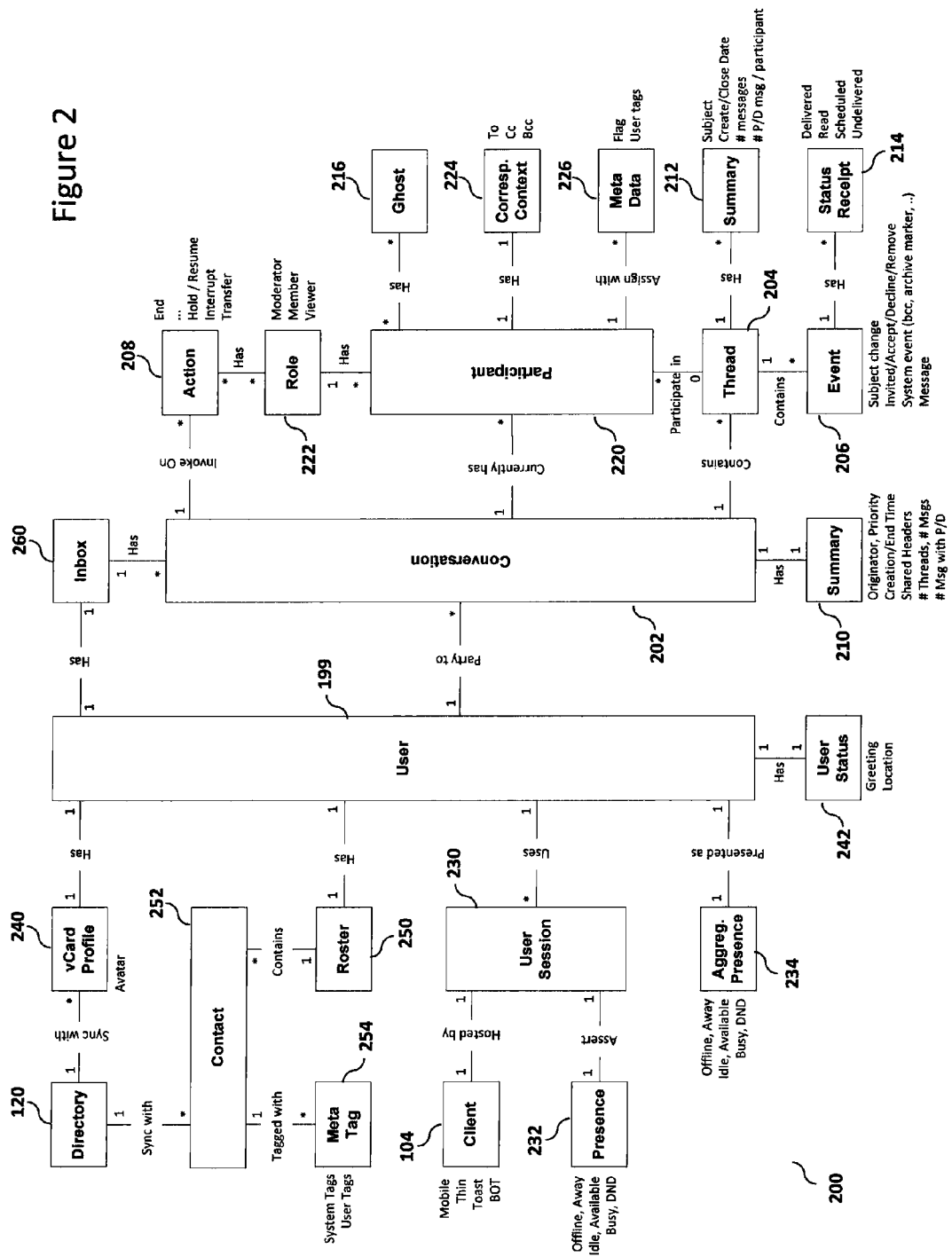
FIG. 2 is a user data model diagram showing exemplary relationships among a user, a user contact roster, a conversation inbox, conversation, threads, and messages according to an embodiment of FIG. 1.

In FIG. 2, components of an embodiment of a conversation user data model include a user 199 participant in conversation 202, which contains threads 204, each thread containing a series of messages which may be encapsulated as events 206. Each conversation 202 has summary data 210 that may contain the conversation originator, conversation priority, conversation creation and end date and information, such as the number of threads 204 and number of messages 206 in the conversation. A conversation 202 consists of a series of one or more linked message threads 204. A thread 204 is a series of one or more messages sent amongst existing (and added) participants, which may share the same subject for the messages. In one embodiment, each thread is linear, namely, no sub-conversations are provided. As such, a thread has a single beginning and a single end. In other embodiments, threads may have branches. A thread may be demarcated by participant or subject changes or other criteria. A thread can be shared amongst the participants present in the conversation during the duration of the thread. Further details on relationships among conversations, threads and messages are provided below.

Each thread 204 represents one segment of conversation 202. A thread has a number of participants 220 and summary 212 containing data elements, such as subject, thread creation and close date and number of messages in the thread. In one embodiment, if there is a change to a list of participants for the current thread (such as the removal of a participant) or if the subject matter changes (for example, by a change in the subject line for a message in the thread) or a change in another criteria (such as expiry of time), then the current thread is deemed to have closed. Thread 204 including messages and events 206 within the thread are shared amongst participants 220 associated with the thread in the conversation 202. In one embodiment, upon closing of a thread, details of the thread including the thread summary and all the associated messages 206 are written to message archive 130.

Each thread 204 may contain events 206 relating to the conversation, such as a subject change, an invitation of additional participants, notification of participants accepting or declining invitation, removal of participants from a conversation, or participants leaving a conversation and messages. For each message 206, status receipts 214 are generated at various points during creation, transmission, delivery and reading of a message by participants. The receipts show a progression of processing of the message from the originating participant to server 106 to the recipient participants. Exemplary types of message receipts provided include messages reflecting that the message have been: queued at the sender client for transmission; sent by the client to the server; received by the server pending delivery to the clients of the recipient participants; delivered to a recipient; read by a recipient; and not delivered to a recipient. Message status data in the receipts can be analyzed for messaging compliance, auditing and eDiscovery by an embodiment.

In one embodiment, a conversation 202 starts with at least one participant 220, with an open message thread 204 with at least one message 206. Until the conversation is ended, any number of serialized non-branching threads may be added to the conversation. Once a conversation is ended, no further threads may be created within the ended conversation. If the conversation is closed, the conversation may be hidden from the user interface of the user client, but the conversation remains active. While a thread is open, any number of serialized messages may be added to the thread. If the current thread is closed, and if the conversation has not yet ended, a new message thread 204 starts on the next message 206 sent into the conversation 202. If the list of participants 220 in the conversation becomes empty (e.g. all participants either left the conversation or were removed from it), the thread closes. At this event, the conversation may also end.

In an embodiment a new conversation 202 may be created from a previous conversation, where meta-data associated with the thread summary from the previous conversation can be used to associate the new conversation with a previous conversation.

It will be appreciated that even if after a conversation ends, though no new threads may be added, meta-data, such as the message read status receipt may still change. The conversation and its associated threads and messages within each thread with the meta-data in the conversation and thread summaries are accessible via message store 108 or message archive 130.

When a conversation is created, a user may identify a time-to-live (TTL) time and date associated with the conversation invitation. Data relating to the TTL is stored with the conversation parameters by the system. Any recipient that accepted the conversation invitation prior to the time and date specified by the TTL time becomes a participant of the conversation. Any recipient that attempts to accept the invitation after the time and date specified by the TTL time may see that the invitation has expired and may not be permitted to join the conversation. If no recipient accepts the invitation before the time and date specified by the TTL, the conversation is ended.

In an embodiment, other types of conversations may be modeled using the conversation model and associated protocols. Exemplary types of other conversations include:

- a "blast" conversation, which may have features comparable to a "bcc" message that is delivered to multiple recipients, where a message recipient may only respond back to the originating user;
- a broadcast, which may have features comparable to a "cc" message that is delivered to multiple recipients, where the message recipient may reply back to all participants in the distribution);
- a feed, which may have features comparable to a Really Simple Syndication ("RSS") feed, where users subscribe to a one way broadcast of message from a bot or a reachable contact of the service to the user; and
- a channel, which may have features comparable to persistent chat conversations where authorized participants may discover the conversation and join the channel to view and exchange messages.

For both blast and broadcast conversations, the recipient that accepts the invitation message becomes a participant of the conversation. For feed and channel conversations, the act of subscribing to the feed or channel is equivalent to the user accepting as a participant of the conversation.

For each conversation 202, which may be in the form of a one-to-one, multi-party, blast, broadcast, or other types, the participant 220 depending on the role 222 may have a number of available conversation actions 208 that may be invoked on the conversation. Depending on the assigned privileges associated with the role of the participant, the participant may be able to invoke any of the following commands/requests on the conversation:

- End—all participants removed from the active thread, the active thread is closed, and no further threads and messages may be added to the conversation;
- Close—the conversation is temporarily hidden from the user interface of user client 104;
- Hold/Resume—temporarily freeze the active thread so that no new messages can be entered without closing the thread, and resume a thread that was placed on hold;
- Seize/Release—seize floor control of the active thread within the conversation to gain exclusivity to send messages and place all other participants temporarily in view only mode, and release floor control against a thread. Depending on service configuration and the privilege of the participant, the floor control may be automatically released based on certain criteria, such as time expiry;
- Transfer—transfer the floor control or held thread control to another participant, or transfer the conversation and/or moderator control to another user;
- Interrupt—mark the message within the active thread to indicate conversational context. For instance, a trader may interrupt to mark a bid or offer price so that the trader may compose details of the transaction while the bid and offer might continue to change, or mark that a given bid or offer as off-the-table;
- Merge—merge two (or more) conversations with their associated participants into a new conversation (either with or without the active thread messages); and
- Split—split one conversation into first and second parts (or more), resulting in two (or more) conversations with two subsets of the participants of the original conversation split among the parts.

In one embodiment, for each conversation, the user may control the characteristics of the flow of the conversation. One characteristic sets the conversation in a half duplex mode, which is akin to a walkie-talkie push-to-talk service. This has an effect of making the conversation as view only to all other participants while the user has floor control of the conversation thread. This transition may also be done dynamically by seizing floor control over the active thread in the conversation. During a half-duplex conversation, a participant having sufficient conversation privileges may "seize the floor" to take control of the conversation. Having control of a conversation allows the controller to enter messages while making the active thread view-only to other participants. A message entered appears in sequence in the active thread similar to any conversion except that only the participant with floor control is allowed to submit a message into the active thread. In contrast, in a full duplex mode conversation any participant having a role authorized to submit messages may concurrently contribute messages to the conversation.

The conversation invitation may include addresses included in a distribution list that contains one or more contacts. An existing conversation may be transferred to, or addressed to a group of one or more recipients. When an account receives a conversation invitation, if the account is associated with a distribution list, then, any user in the distribution list may accept the conversation. Upon acceptance, the accepting user is connected in a conversation with the participants. Additional participants may be added to the conversation. As a metaphor, a "desk" is provided for a user account and the desk contains the distribution list for the additional accounts that can receive the message. Privileges may be provided for the user's account. Participants with sufficient privileges may transfer the conversation to another desk. When a conversation is transferred to another desk, the participant may decide to share the message content of the existing thread or alternatively, a new thread may be started after the transfer of the conversation. If the "desk" is a support desk, which may be implemented as a client or bot, a unique support ticket number may be generated and set by the client/bot and stored in the shared header 1216 meta-data of the conversation. As a metaphor, a "desk" may be the compliance team, where any member of the compliance team at a trading firm that may need to review the messages exchanged within the conversation, or a trading team, where any trader may execute the trade request.

In an embodiment, an automatic sharing provision for a conversation is provided, where a message may be shared and forwarded automatically to a set of users when the message is received. On the distribution list, one or more outside accounts are listed, where the "outside" account is not on the original participant list for the message. The outside account may be maintained in a roster associated with the sender's account. Messages in the conversation that are submitted by the outside account to the conversation are formatted to appear to be submitted by the first user account or by the outside account on behalf of first user account. As such, user 199 may initiate a command to "auto share" one or more conversations 202 or messages in the user's inbox 260 with other users in the user's roster 250. From the inbox user interface 800, the user may set "auto share" for all or selective conversations or the user's inbox including new incoming conversation invitations with one or more other contacts. The "auto share" settings may be set for a certain period of time or permanently until subsequently changed or revoked by the user. The "auto share" contact that accepts the "auto share" invite from the user is granted a special "auto share" participant status along with a role that is equivalent to the role assigned to the user within each the conversations. Messages submitted by the "auto share" participant within the conversation may appear to other participants as if the message had been sent by the user, or the routing information may be amended to indicate that the message was sent from the "auto-share" participant on behalf of the user (for example, the "re" line or the "sent from" data may indicate "from Judith", "on behalf of Warren", etc. to reflect the sharing connection). Similarly, from the conversation user interface 900, the user may set "auto share" a conversation with specific provisions relating to threads within the conversation with one or more other contacts.

In an embodiment, social features may be modeled using the conversation model and associated protocols. Exemplary types of social features include:

- a "greeting", which may have features similar to a status update or a user tag line; a greeting may be modeled as a conversation channel where each update may be represented as a conversation thread and contacts that viewed the greeting as participants with "viewer only" role and are tracked with message read receipts (a greeting may be made viewable to all other users of the service or only to select others, such as those on the user's roster);
- a "wall", which may have features comparable to a journal with open exchange of messages and notes; a wall may be modeled as a conversation channel where participants that post various messages and media content as well as participants that read the content may be tracked (a wall may be made accessible to all other users of the service or only to select others that the user granted shared access and the user may grant selective contacts with access to the "wall" with roles of member or viewer);
- a "feed publisher", which may have features comparable to a "RSS" feed; a feed publisher may be modeled as a conversation channel where each content article associated with the feed may be represented as a conversation thread (the user as publisher of the feed may configure the feed so that other participants may be allowed to only view the articles or may be allowed to contribute comments); and
- a "feed aggregator", which may have features comparable to a "RSS feed aggregator", may be modeled as a conversation channel where various content articles and updates that are injected by publishers into the channel may be modeled as threads.

Now, further detail is provided relating to the participants of a thread within a conversation. Each thread 204 of a conversation 202 has a list of participants 220, with each participant having a role 222 of moderator, member (regular participant) or viewer (silent participant). A moderator has exclusive powers over the conversation, such as the ability to end a conversation and to remove a participant from the conversation. A moderator may also confer moderator roles to other member and viewer participants. Unlike moderators, members have less control over the conversation, but can change the subject of the conversation and can invite other participants to the conversation. Viewers are allowed to invite other participants, but are only allowed to view the messages and cannot participate in the conversation (message entry field is grey out and disabled for viewers). The type of participant may be set during creation of a conversation or when inviting the participant. Any participant may leave a conversation independently.

In an embodiment of the conversation model, one or more moderators may be assigned to the conversation. A moderator may be the originator of the message or a participant that has been assigned supervisory rights to the conversation. Such supervisory rights can be defined through user organizational charts having defined ranks, powers and limitations. For example, in an organization having various levels of rank, a moderator can be defined as a person who is linked to a user and that has a superior rank to the user. In a one-to-one conversation, both participants can be moderators. In a multi-party conversation, the participant that created the conversation is assigned as the initial moderator; however in other embodiments, the assignment of the moderator may be changed. A user in a conversation can control privileges that other users have for the conversation. Different users may have different privileges. For example an originator of a conversation may have full control on who can join a conversation and what levels of participation are provided for the members (e.g. read only, full read and reply rights, invitation rights, etc.). Invitees to a conversation may have a different, lower set of privileges (e.g. read only, no forwarding rights, etc.).

For a conversation, a participant may include ghost reviewer 216, which is one particular class of participants. In one embodiment, a ghost reviewer has equivalent rights to the moderator, but also has compliance supervisory rights relating to conversations. A ghost reviewer participant may enter selected conversations, optionally as an invisible and silent observer, and revoke or change the rights of the moderator in the conversation. A bot participant or a bot with ghost role in the conversation may monitor the conversation for specific keywords. When a new message is posted, the message can be scanned for keywords and if the identified keywords are detected in the message, the ghost reviewer may take certain actions against the conversation, such as sending warning message to any of the participants determined to have a compliance violation, closing the message thread, or ending the conversation. The bot participant or a bot with ghost role may also independently initiate a compliance review action by the ghost reviewer for a conversation.

In an embodiment of the conversation model, each participant 220 in conversation 202 can also be assigned with a correspondence context 224, which may be associated with a set of rights for the conversation. The correspondence context may be determined from the mailing list for the conversation, where active, passive and silent contexts are assigned. This may be based on the delivery criteria, where an active context is assigned to addressees in the "to" field, a passive context is assigned to addressees in the "cc" field and a silent context is assigned to addressee in the "bcc" field. In general, the correspondence context of a given participant is set by the user that invited that participant. Privileges and restrictions are normally set based on the participant's role in the conversation (e.g. moderator, member or viewer) and are independent of the correspondence context of the participant ("to", "cc" or "bcc"). As an embodiment, participants that are addressed as "bcc" preferably cannot invite additional participants nor send "bcc" messages to other participants. Unlike traditional email systems, messages from all participants in the conversation can be provided to "bcc" participants.

To start a new conversation, the originating participant composes a new message to be sent and activates the "send" command on his/her device 104A-C. Before delivering the message to the listed recipients, the system generates and sends a conversation request with the subject or the first message if no subject was specified to each listed recipient. When a listed recipient receives and opens the request message at his/her device, a user interface is provided listing options regarding the conversation. One option is to accept the conversation. If accepted, the conversation is established between the originating participant and recipients that accepted the conversation request. Another option is to reject the message. If rejected, the conversation ends, and a rejection message is generated and sent to the originating user that the recipient declined the conversation request.

Decisions of listed recipients are tracked in a log associated with the conversation request. The logs can be stored in long term storage in the message archive server 130 and/or stored in short term storage in the message store system 108. Through such logs, the system tracks the list of participants that accepted the conversation request and their status for messages, threads and conversations. Using that status information, message delivery parameters can be tracked and followed. For example, if client 104 rejects participating in a message, then the list can be used to determine that no messages are to be sent to that client 104. The logs are used to provide message compliance control and auditing by providing keyword and participant searching fields that allow an administrator to search and identify messages of threads associated with specific participants, conversation subjects, etc.

To access the messaging service, an embodiment provides user 199 with concurrent user sessions 230. Each of the user sessions 230 may be connected through a client 104 on a number of user devices 104A, 1048, 104C. The service may assert an aggregate presence 234 associated with the user which may be based on the presence 232 associated with each of the user's sessions 230. To help the user manage messaging communications, an embodiment provides the client 104 with a user interface with a roster 250 containing the user's contacts 252, and an inbox 260 which holds a selected set of the user's conversations 202. Each user 199 has a profile 240 which may contain the user's VCard and avatar image, and may be associated with a user status 242, such as the user greeting or status message and user meta-location. User roster 250 may contain a list of contacts 252, each of which may be associated with meta tags 254, such as system tags (for example, contacts on roster belonging to marketing or sale or operations group) and user tags (for example, a contact tagged as a favorite). The user profile 240 as well as the contacts 252 and roster 250 have data that is synchronized with service directory 120. Roster 250 may include contacts from the directory in service manager 120, imported from the user's directory, such as Microsoft Active Directory (trademark), and contacts invited from other sources, such as the user phone's contact address book.

In an embodiment, the inbox 260 interface provides client 104 with a list of conversations that the user can participate in. This list includes a delta synchronization of changes in messages from FE server 106 to a client 104. The list may be retrieved via a paging mechanism from server 106 to client 104. Due to device resource constraints or depending on the sorting order, some of the conversations may not be shown in the active presentation view on the client 104. If new messages or events are posted to an active conversation but perhaps hidden from the presented view, the conversation appears in the presented view with indication of new unread messages or events. Typically, only active conversations are retained in the inbox. Ended conversations are archived in message archive server 130 and such conversations may be resumed as a separate new conversation. Closed conversations are still active conversations, but are not presented in the inbox on the client 104. Closed conversations may be presented in the inbox view if there are new messages or events associated with the closed conversation. Conversations in the inbox may be filtered based on a status or criteria of the conversations, such as all, new, sent, received, multi-party, recent and favorites, and each of the filtered lists may be further sorted by date, subject, priority and flag.

An embodiment provides several features that are useful for mobile client 104B or any client on devices with constrained battery power, connection bandwidth, computing processing power and memory storage. One feature of an embodiment provides offline message processing. There may be instances where client 104B is off-line (e.g. during a flight). Locally at that client 104, its user can compose still messages, but the offline messages are stored at client 104. Once a connection to FE server 106 is re-established, client 104 can send the stored offline messages to the system which appends the messages into the active thread of the conversation and receives indication of messages pending delivery to the recipient participants. Messages can be sent and conversation invites can be initiated to recipient participants regardless of their presence status.

Mobile client 1048 implements communication bandwidth and power saving optimizations that are mode dependent for device 104B. Typically only the differences of existing data and new data are transferred from server 106 to client 104B. If client 1048 is connected on-line, all messages, events and status data may be exchanged between the client and server 106. However, if the user locks the keypad of the mobile device or there is no user activity for a period of time, mobile client 1048 enters a "sleep" mode and does not need presence data or personal event data (for example event data reflecting that another user is typing message within a conversation). Avoiding the exchange and processing of this data in "sleep" mode conserves battery power and communication bandwidth. Upon an absence of user activity or new incoming event data for a period of time in "sleep" mode, client 104B may enter a "hibernate" mode, which provides even less activated components in client 1046. Typically, only conversation messages and invitations are exchanged in a hibernate mode. However, system maintenance messages for mobile devices that do not support push notification may also be exchanged. If client 1048 is on a device that supports push notifications, such as a BlackBerry (trade-mark) device, message and event data may be pushed to client 1048. If mobile device 104B is in an "offline" mode, then minimal or no data is exchanged between device 1048 and server 106. The client can enter the "offline" mode via manual user action or due to lack of data connection, such as during a flight.

For the offline feature, a client application for mobile device 1048 provides optimized network transport for bandwidth and battery savings with the ability to manage dropped data connections, loss of radio signal, dropped packets, network traffic congestion and high data transit latency by automatically switching to offline messaging and reconnecting immediately upon the establishment of a usable data connection. During a connection loss event, the client application can provide an exponential back off when attempts are made to reconnect to the network. When a connection is established, the client application connects device 1048 to server 106 using a persistent long live session key with low packet overhead. Server 106 supports configurable hysteresis session caching so that other participants in the conversation do not see the user experiencing transient data connection loss. Client 104 and server 106 also provide tiered transport queues allowing user action to be prioritized over events and less time critical data, such as contact avatar images.

Another feature provides service parity between a thin-client 104 on desktop device 104A and mobile client on device 104B. As such, device agnostic access to features of an embodiment are provided as well as features to allow transitions from desktop 104A to mobile device 104B and through different locations (e.g. at work, home, in transit, etc.).

An embodiment manages situations where a user is accessing the system simultaneously through two or more devices 104. For example, a user may access the system through a desktop client 104A and then initiate another access through a mobile client 104B. A user can initiate a message conversation on desktop 104A and access the same conversation on mobile device 104B (and vice versa) with full context of the threads and messages of the conversation.

For these simultaneous accesses, an embodiment provides message synchronization and message view bookmarking across a user's active clients and synchronizes a user's actions when such simultaneous accesses are occurring. For example, pending, delivered, and read status receipt for each message is propagated across the system so that if the user switches from one client 104 to another client, the user may resume from the point of the last read message.

Mobile client 104 for device 104B connects to a mobile gateway module within an instance of FE server 106. The gateway authenticates and establishes a connection with client 104 and manages and maintains a secured transport with the client. The gateway may also optimize the efficiency and throughput of the transport, by for example, bundling service data to reduce API transactions and round trips. The gateway can utilize transport encryption, such as AES, rather than HTTPS for always-on applications and can perform delta synchronization between FE server 106 and a client on device 104B. To minimize bandwidth usage, the gateway may employ delta synchronization schemes to download and synchronize only data to the client 104 that have changed. One preferred connection is via TCP over a HTTP connection. The choice of transport connections provides several messaging implications, such as the frequency duration for keep-alive messages. For example, for TCP transport, a keep-alive message is required every 110 seconds for most mobile operator networks to sustain the data link. The keep-alive or HTTP polling message traffic typically account for a significant portion of the data traffic usage.

Now, further detail is provided on how connections are made from clients 104 to FE servers 106. As shown in FIG. 1, client applications on devices 104A-C connect and access facilities of an embodiment via FE server 106. Connections can be established through several protocols, providing different method connection methods, including:

- a bootstrap protocol that determines supported authentication protocols, and hosts for serving the client requesting service access;
- an authentication protocol that provides service authentication and service authorization tokens for accessing services of an embodiment; and
- a conversation protocol, providing access to the user's roster, conversation inbox, and exchange of messages between users.

Details on these exemplary protocols are provided below.

Figure 3:
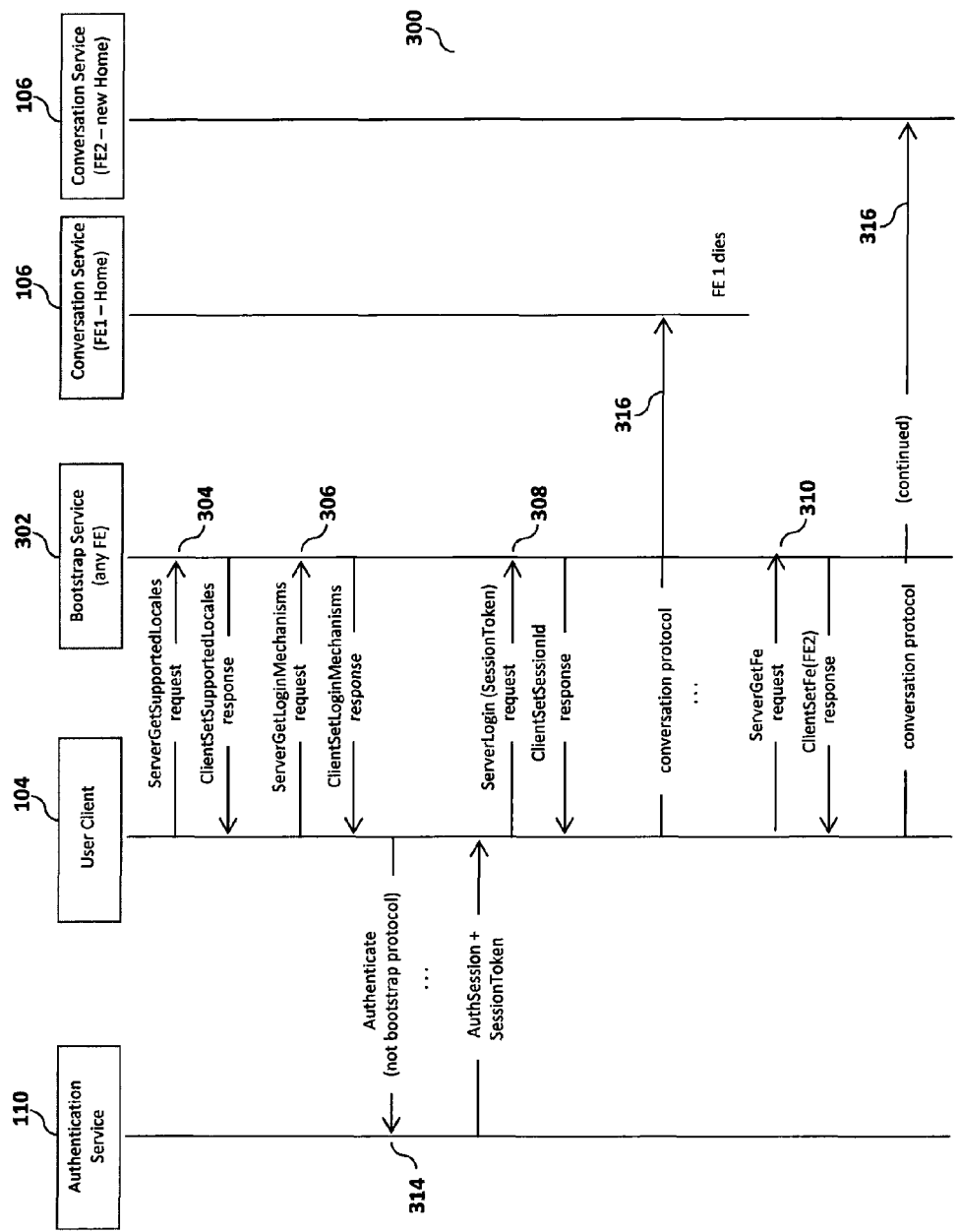
FIG. 3 is a messaging diagram showing communications between the data center and the device of FIG. 1 during a sign-on request initiated by the client.

Turning now to FIG. 3, exemplary message streams are shown for selected protocols. Application client 104 is installed on any of the devices 104A-C and it communicates with various servers, such as authentication servers 110 for authentication and FE servers 106 for messaging services. For initial connection setup, client 104 accesses a bootstrap service 302 to determine the authentication service and service options, such as localization. With this arrangement, an application accessing the bootstrap protocol only needs to know the URL for the bootstrap service. Locations of authentication and conversation services are provided in subsequent responses in the bootstrap service. Processing of messages between client 104 and FE server 106 are handled in FE server 106 by bootstrap process 302.

The exemplary bootstrap protocol comprises messages 304, 306, 308 and 310 to get the client locale parameters and user login mechanism and execute the user authentication and service authorization process. The protocol may be implemented as a synchronous protocol with messages encoded in JSON (JavaScript Object Notation) and transported over HTTPS or TCP. When using HTTPS, the protocol supports load-balancing that is transparent to clients and allows the SSL to be decrypted at multiple FE servers 106 instead of a traditional load balancer and can support simple, stateless load-balancer configurations.

Client 104 sends service locale message 304 to get configuration data from process 302, such as supported languages. Next, client 104 sends a mechanism request message 306 to get login mechanisms from process 302. Exemplary data that is provided by process 302 include details on authentication services FE server 106 supports. After client 104 is successfully authenticated by authentication service 110, client 104 receives the authentication session ID as well as the service ticket token from service 110. The client 104 then presents 308 the service ticket token to the bootstrap service 302 to obtain the service session ID which it then uses to establish a messaging session with FE server 106.

Using the service session, client 104 then uses the conversation protocol 316 to exchange messages with FE server 106. If FE server 106 cannot provide service to client 104, then client 104 initiates bootstrap request 310 to request service from another FE server 106, and then uses the conversation protocol 316 to communicate with a new FE server 106.

To further adapt service handling upon authentication, client 104, which may be on a mobile device 104B, may provide FE server 106 with static user agent information, such as client application name, user agent client release number and client build identifier. Client 104 may also provide dynamic device information to FE server 106, such as device its manufacturer, its model, its operating system data, and device details, such as IMEI or ESN, device ID, carrier ID, network ID, country code, and user's MSISDN associated with the device. This information allows an embodiment to provide specific user sign-in handling, such as optional and mandatory client upgrades, sign-in messages and private-label user-interface themes. For mobile client 104 on device 104B, bootstrap service 302 returns a AES key which client 104 may use to securely encrypt message and event data over a TCP channel with FE server 106 rather than using a HTTPS transport which is less optimal for battery and bandwidth consumption.

After client 104 has established a messaging session with FE server 106, the user's roster 250 may be synchronized from the user directory in the service manager 120 through FE server 106 to client 104. The aggregated presence status 234 associated with the contacts in the user's roster 250 is also propagated by the presence service of FE server 106 to client 104. Further, FE server 106 may also synchronize or download the user's conversation summary inbox 260 from message store 108 to client 104. Client 104 then continues with existing conversations, creates new conversations or accepts incoming conversation invites to start conversations via the conversation protocol 316. When an incoming message is delivered to client 104 or after the message is presented to the user, a corresponding message delivery or message read receipt is then sent by client 104 to FE server 106 which then propagates the message delivery or message read receipt 214 to the message originator.

With some network level components of a system of an embodiment described, further detail is provided on features of an embodiment regarding message creation and tracking.

Figure 4:
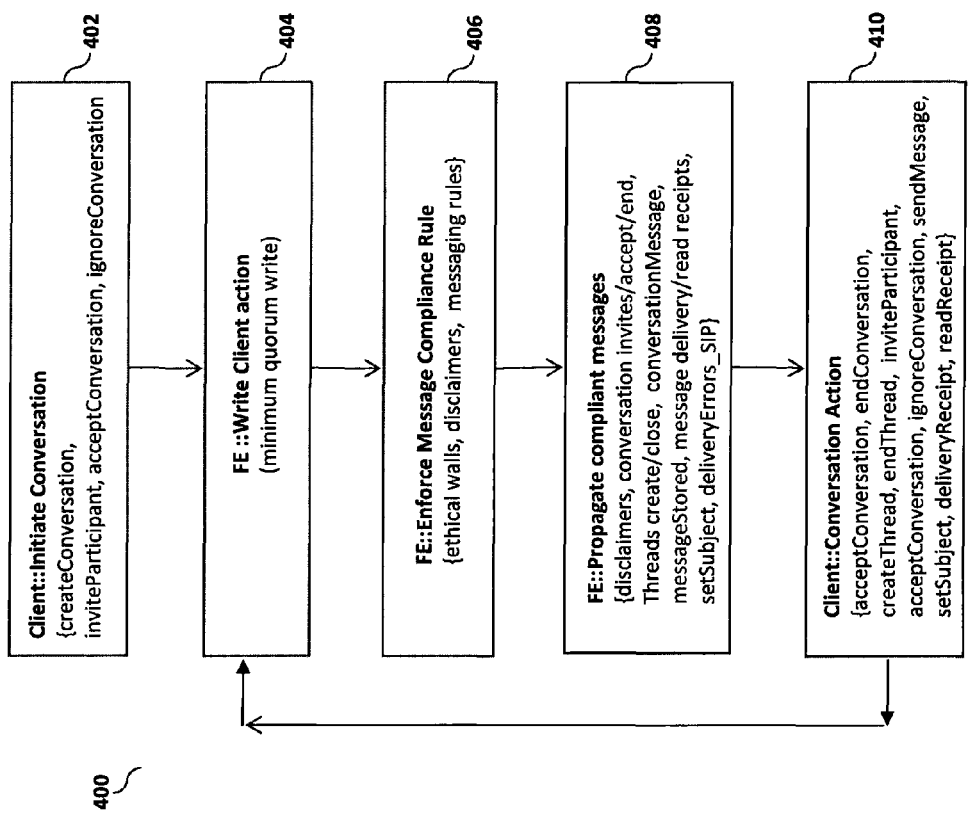
FIG. 4 is a flow chart of processes performed during establishing and managing the conversation according to an embodiment of FIG. 1.

FIG. 4 shows flow chart 400 of processes for initiating a conversation by an embodiment. To begin, a client can initiate a conversation by creating a conversation, inviting a participant to a conversation, or accepting a conversation invite per process 402. All user actions from the client 104 are written by FE server 106 to message store 108, per process 404. Preferably, the data is written to at least two separate, preferably geographically diverse, instances of message store 108. At process 406, FE server 106 applies to the conversation compliance and messaging enforcement policies, such as ethical walls, to ensure users are permitted to communicate, flag specific keywords in messages to compliance officers and add specific compliance messaging disclaimers. At process 408, FE server 106 then propagates the compliant messages to all instances of the user clients 104, including the delta synchronization of such data to clients on mobile devices 104B, as well as errors and message status receipt data, such as delivered and read. Next, at process 410, the user may then take additional actions against the messages and conversations, such as invite more participants, ignore message invites, end the conversation, hold and resume the conversation, create new message thread, close message thread, read message and send message.

Message status states and receipts 214 associated with each message are generated at various points during creation, transmission, delivery and reading of a message 206 by participants 220. The states and receipts show a progression of processing of the message from the originating participant to server 106 to the recipient participants. Table 2 shows exemplary message status states and receipts 214 that can be generated.

TABLE 2

Message Status States and Receipts

| | Detail |
|---|---|
| Queued | State: Message has been queued for transmission (usually seen only on the mobile client when the client needs to turn on the device radio to connect to the network, or a thick client in offline mode) |
| Sent | State: Message has been sent from the client to the Service |
| Pending | State: Message has been received by the Service, redundantly stored, and is being delivered to the recipients |
| Propagated | State: Message has been sent by the Service, but has not yet been delivered to/received by the end client. |
| Delivered | State/Receipt: Message has been delivered to the end client |
| Read | State/Receipt: Message has been presented to be read by the end user |
| Ignored | State: applicable to the conversation invitation rather than messages but the messages may be presented visually as ignored if the conversation invitation was declined by the recipient. |
| Not delivered | State/Receipt: Message was not delivered to the end user (for example, the message may have been sent into a conversation that no longer exists or messages were sent to a user client of a federated service, such as SIP, but the user is offline). |
| Scheduled | State: Message has been received by the Service, redundantly stored, and has been scheduled for future delivery to the active participants in the active thread of the conversation. |
| Un-Ack | State: Messages sent to user client of a federated service, such as SIP but not yet acknowledged |
| Error | State: Message sent to a user client of a federated service, such as SIP but returned as error |

For outgoing message that a user sends to other participants in the conversation, a set of timestamps for the message status receipts are presented to the sender user on client 104 sending the message to FE server 106. Except for local device time for "Queued" and "Sent", the timestamps for each of the message status receipts are local time to the client 104 but are measured relative to UTC time of FE server 106. Exemplary timestamps and message status are:

Queued—local timestamp of the message when the sender client 104 queue the message for sending to server 106. The "queued" message status indication is changed to Sent after the transport of client 104 acknowledged that the message is being sent.

Sent—local timestamp the message after server 106 confirmed that it received the message from the sender client 104. This timestamp is presented to the user as the message "sent" time only after the client 104 received the UTC relative time reference. All instances of the user's client 104 show the same sent time for a given message.

Pending—the local timestamp of the message after server 106 received and stored the message pending delivery to the recipient participant client. On the sender client 104, the message status is shown as "pending" until the message status reached the delivered state.

Delivered—the local timestamp of the message after the first recipient participant client 104 confirmed that it received the message. On the sender client 104, the message status is shown as "delivered" until the message status reached the read state.

Not Delivered—the local timestamp of the message after server 106 received and stored the message pending delivery to the recipient participant client. On the sender client 104, the message status is shown as "Not Delivered" if the message was sent into a conversation that has already ended, was not delivered to all participants in the active thread, or was sent to a federated contact, such as a SIP user, that is offline.

Scheduled—on sender client 104, the message status is shown as "Scheduled" with the local timestamp of the message after server 106 received and stored the message pending delivery to the recipient participant client, and also the local time of the scheduled time and date of future delivery.

Ignored—the local timestamp of the message after server 106 received and stored the conversation invitation decline message from the recipient participant client. On the sender client 104, the message status is shown as "Ignored" if all the recipients of the conversation invitation ignored the conversation request, or the "ignored" status may be shown against a list of recipients that declined the invitation.

Propagated—the local timestamp of message after server 106 received and store the message and propagated for deliver to message recipients on messaging networks, such as Microsoft OCS (trade-mark) that do not provide delivery or read receipt.

Read—the local timestamp of the message after the message is presented with the opportunity for the recipient participant to view the message. At that point, the recipient participant client 104 send the read acknowledgement back to server 106 and the "read" timestamp is then propagated back to the sender client 104.

For incoming message that a user receives from other participants in the conversation, the following are timestamps for the message status receipts presented to the receiving user on client 104 receiving the message from FE server 106. The timestamps for each of the message status receipts are local time to the client 104 but are measured relative to UTC time of FE server 106.

Sent—local timestamp the message was received and stored on server 106. As the message sent time is the time the message was sent to the server, it is essentially the time the message was received and stored on server 106. This timestamp is presented to the user as the message "sent" time relative to the server UTC time reference.

For messages that were scheduled for delivery, the timestamp is the message delivery time rather than the original sent time from the message originator user client.

Read—the local timestamp of the message after the message is presented with the opportunity for the receiving user to view the message. At that point, the user client 104 that received the message send the read acknowledgement to server 106, and the "read" time stamp is then propagated by FE server 106 back to the sender client 104.

When a message is created, but not yet sent, it has a "queued" status. Typically, this status is only presented to the user and usually only visible to the user when the user device is offline or has no data connectivity. When the queued messages are submitted to FE server 106, the messages may be contextually misaligned with other messages exchanged in the conversation while client 104 composed those messages in online mode. In this case, the queued messages are added to the tail of the current message thread in the active conversation. There would be an indication that such messages are contextually associated with an earlier message of a given thread in the conversation.

A message may have a "Not Delivered" status if the conversation ends before the user sends the message. When a conversation ends before the message is submitted to server 106, client 104 prompts the sender user as to whether to create a new conversation to the same list of participants using the undelivered messages.

Now, details are provided on exemplary states and lifecycle of a one-to-one and multi-party conversation. Table 3 shows one embodiment of the states of a conversation from a user's perspective. Notable conversation states for a user are "Non-participant" when the user is not yet involved with the conversation, "Invited" when the user has been invited to the conversation but not yet accepted the invitation, "Participant" when the user has accepted the conversation invitation, and "Ended" when the user ended the conversation or the conversation has ended. There are two additional conversation states "Offline" and "Re-sync" that reflect states when user client in offline mode or while the client is performing a re-synchronization of user data between client 104 and FE server 106.

TABLE 3

Conversation States

| State | Description |
| --- | --- |
| Non-Participant | User is not in the conversation and requires an invitation to join it. The user may have previously been a participant and left it. The conversation may also have ended (but after they left it). |
| Invited | User is in the conversation's participants list but has not accepted, ignored it yet or has been removed from it. |
| Participant | User has accepted or created the conversation and my send messages (and invite others depending on access control lists |
| Ended | A user with moderator role in a conversation may end the conversation and all current participants of the conversation are notified. A conversation may also end if the last participant leaves the conversation but participants are not notified of such end state change. Ended conversations cannot have new threads/messages added to them. However, a new separate conversation may be created using the same last set of participants as well as the subject of an ended conversation. |
| Offline | Client has detected loss of connectivity to the Service and will periodically try to re-establish it, or user manually request the client to be in offline state |

TABLE 3-continued

Conversation States

| State | Description |
| --- | --- |
| Re-sync | Connectivity to the system has been restored from an offline state and the client is synchronizing the state of the conversations for this client. A client may allow offline messaging, which may require two-way synchronization (changes/messages from the system merged with messages sent by the user while they were offline). After a re-sync, the client will set the conversation to the appropriate state. |

Figure 5:
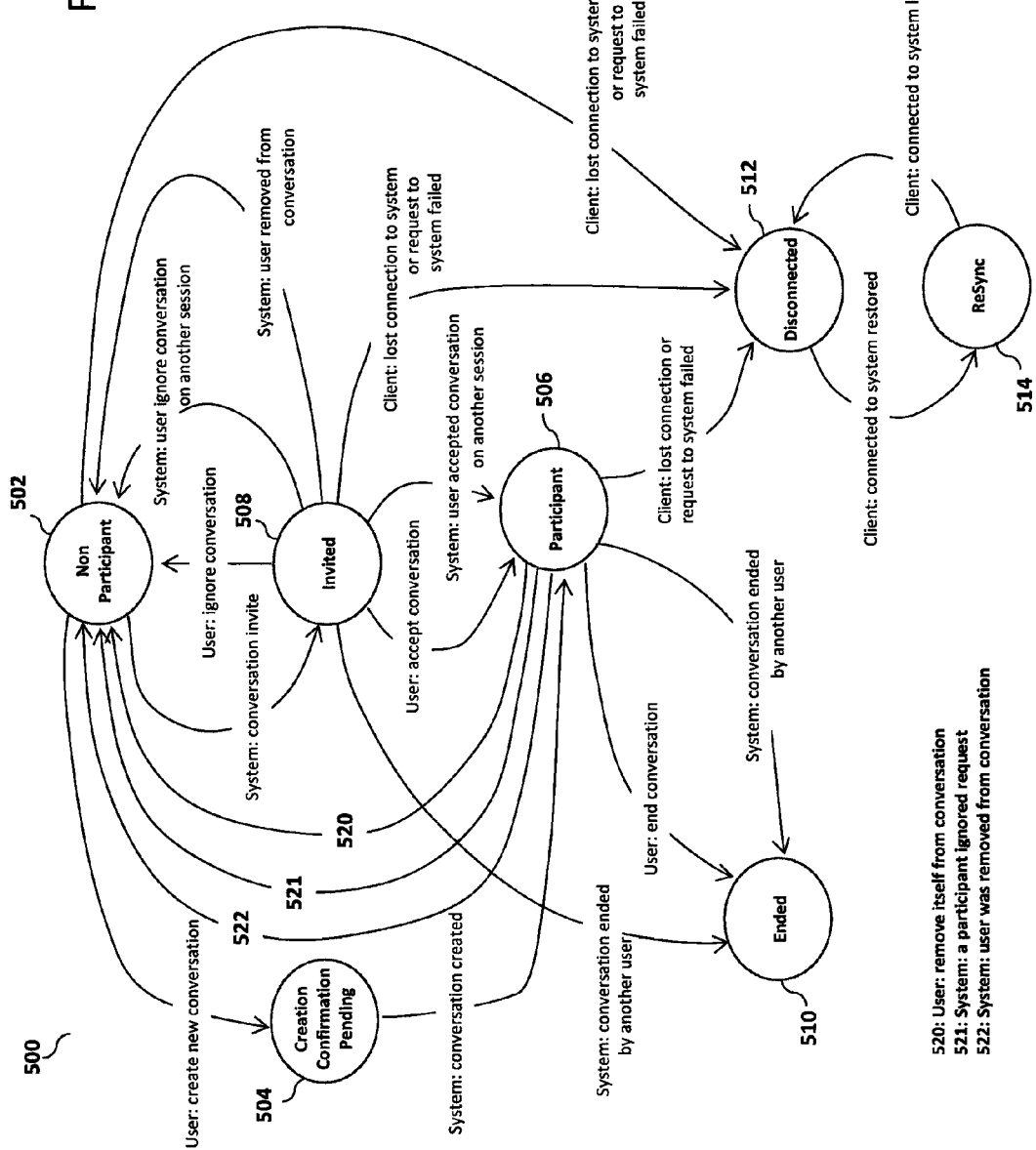
FIG. 5 is a state diagram of an exemplary conversation managed by the data center according to an embodiment of FIG. 1.

FIG. 5 shows states of conversation 500 which is an exemplary instance of the conversation 202 from the perspective of the end user 199. Conversation 500 starts in non-participant state 502. After the user creates the conversation via process 402, conversation 500 transits to creation confirmation pending state 504, which changes to participant state 506 after the system stores the user's message via process 404. The conversation is placed in invited state 508 after FE server 106 propagates the conversation invitation to the recipient participants via process 408. The conversation changes to non-participant state 502 if the recipient user ignores the invitation. Otherwise, the conversation moves to participant state 506 if the recipient user accepts the invitation via process 410. If the user ends the conversation or if the conversation is ended by another moderator of the conversation, the conversation moves to ended state 510 via process 410.

As shown in FIG. 5, if user 199 enters offline mode either manually or experience loss of data connection (such as during a flight), the conversation state relative to the user transits to the Disconnected state 512. In the disconnected state, the user can continue to read and compose messages in offline mode. If the user reconnects to online state either manually or after data connection is restored, the conversation is in the re-synchronization (re-sync) state 514 while data is synchronized between client 104 and FE server 106. After the conversation is re-synchronized, the conversation may be in any of the creation confirmation pending, non-participant, invited, participant, and ended states depending on the post-synchronization state of the conversation.

For simplicity, the non-state changing events are omitted in FIG. 5 for conversation 500. For instance, while the user is in invited state 508 and if the recipient has not yet accepted the conversation request, the originating user may change subject. As another example, messages in a conversation prior to the acceptance of the conversation invitation by the recipient may be optionally pre-fetched for delivery to the recipient participant so that an up-to-date set of messages is presented to the invitee immediately upon acceptance of the conversation request. This enhances the recipient participant's conversation experience, notably where the recipient participant client 104 is connected via data connection that has long connection setup time (for instance, a wireless connection) or the recipient participant client 104 is experiencing data connection network traffic congestion. Pre-fetching of the messages for delivery to the recipient participant user client 104 may be done while the recipient participant is in invited state 508.

Referring to FIG. 5, to address issues with race conditions and re-synchronizations, an embodiment utilizes a finite state machine to synchronize operational functions between clients 104 and server 106. As part of the state machine, events (for example, creating conversation, sending message, closing a thread, etc.) are analyzed with their effect on each state. In supporting a client 104 that allows the user to create and queue messages while in offline state, a number of possible inconsistencies need to be handled between an offline client's view of a conversation and the current, real time view of the conversation as managed by the system. Table 4 shows exemplary conflicts of states between an offline client and an on-going conversation. Such conditions are considered to be race conditions.

TABLE 4

Client Offline Race Conditions

| Conflicting Events | Source of Conflict | Resolution | Prompt User? |
|---|---|---|---|
| Accept conversation | User may have accepted it in one of his other sessions | First accept received at server-subsequent requests ignored | No |
| Ignore conversation | User may have rejected it in one of his other sessions | First reject received at server-subsequent requests ignored | No |
| Close thread | Thread may have already been closed | Ignore | No |
| Start thread by sending a message | A new thread may have already be started by another user or another session of this user | Put messages into currently active thread | No |
| Set subject | Previous active thread may have already closed | Set subject | No |
| Send message | User may have been removed as participant of the conversation or the conversation was ended | Messages are not sent | Inform user that messages could not be sent; prompt if user wants to create a new conversation with the same participants to resend the messages |

One class of race conditions is caused by asynchronous actions taken by user on a client 104 composing, reading and/or processing messages in offline mode while concurrently other events and messages occurred in the conversation with the other participants. When the user client 104 reconnects to the service and changes from offline to online mode, the roster contacts, presence status, conversations in the inbox, threads in a conversation, and messages in the threads all need to be synchronized between client 104 and FE server 106. In some cases, some contacts may have been removed from the roster, additional participants may have been added to the conversation, conversations may have already ended, and threads may have already closed. Also, upon reconnecting to online mode, various messages within the conversation (messages by the user in offline mode, messages from other users while the user client is disconnected from the service) and read status of the messages need to be updated. The system 100 provides a conversation protocol that addresses this class of race conditions.

Another class of race conditions relates to situations where a user is simultaneously accessing multiple clients 104 and is making independent (and potentially different) actions regarding contacts, presence, conversations actions, and messages on those clients 104 concurrently. For instance, the user may access the service concurrently on client 104 on devices 104A-C. To address potential inconsistencies between the data and user actions on the user's concurrent instances of client 104, the system provides a conversation protocol for synchronizing the changes and actions on all of the user's concurrent client instances.

Figure 6:
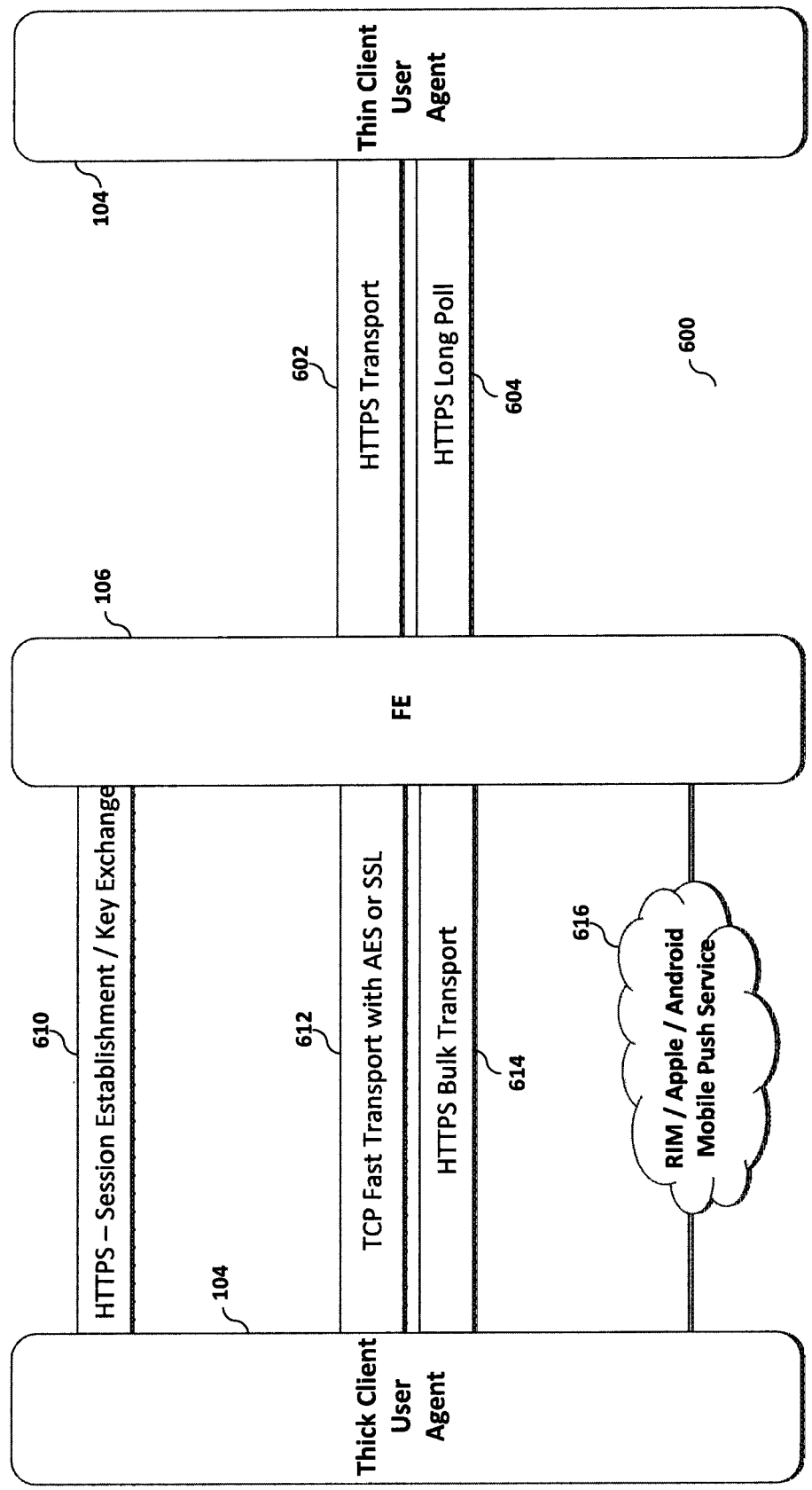
FIG. 6 is a block diagram shown an exemplary transport connection for a conversation protocol for the conversation according to an embodiment of FIG. 1.

Now, further details are provided on an exemplary protocol used for conversations by an embodiment. In one embodiment, the conversation protocol 316 is implemented as an asynchronous interface where the message event may be initiated by the client 104 or server 106. As shown in FIG. 6, the transport for the conversation protocol between browser thin client 104 and server 106 is preferably implemented as secure socket layer (SSL) over Transmission Control Protocol (TCP) or HTTPS for requests 602; and a separate HTTPS transport for long poll initiated by the thin client for responses and connections 604. The transport for the conversation protocol between thick client 104 and server 106 is preferably HTTPS for session key exchange 610, TCP with Advanced Encryption Standard (AES) encryption over TCP 612 for messages, events, and status data; a separate HTTPS transport 614 for bulk data, such as files and images; and device platform specific transport for push notification service 616.

To provide a responsive user experience, client 104 needs to be able to present aspects of the roster contacts quickly upon user sign-in, and need to able to load the conversations in the inbox quickly within the user waiting for the system to synchronize and process data. All devices 104A-C have different limitations on device battery power, data connection bandwidth and cost, processing power, and device memory. As such, one embodiment provides a conversation protocol to have one or more of the following capabilities:

Delta Synchronization—for a thick client, after the initial sync, only difference (delta) changes for roster, conversation inbox, conversation threads and messages in the thread are exchanged between client and server. The synchronization of messages allows exchanging of messages from a given message ID and the payload is optimized to bundle the message status receipts without the need for separate API calls and avoiding multiple round trips. For both thick and thin clients, the synchronization transfers the critical data first and presented to the user, while less critical data can be downloaded asynchronously in a background process. Where possible, the data is locally cached without the need to retrieve and download the data each time constantly.

Summary and Paging—retrieval of a conversation with thread summary indicating the number of participants, thread message count, subject, latest message ID and last message ID read (bookmarking so that if the user transit from one instance of client 104 to another, the user start consuming the messages from the previous message consumption point). The protocol provides APIs allowing the conversations in the inbox, threads in the conversation and messages in the thread to be retrieved or pre-fetched in page chunks so that data can be processed and rendered more responsively with less delay on the client user interface.

Minimal Messages in protocol stream—support for multi-party conversations that involve message status receipts, such as pending, delivered and read and synchronization of conversation data across the user's concurrent multiple instances of the client involves large numbers of protocol streams. The conversation protocol characterizes the nature of the messages and reduces the number of messages and the number of message streams to an absolute minimum but sufficient to allow each client 104 to accurately reconstruct the roster, conversation list, the conversation messages and the participant events.

In an embodiment of the conversation protocol 316, a user 199 may be presented with basic presence status 232, such as offline and available of other users in a corporate or global directory. A more detailed expanded presence view (for example, offline, available, away, idle, busy, do not disturb, etc.) may be provided when a contact is added to the user's roster (per Table 5). When a user (user A) adds a contact 252 (user B) to his roster 250, a message is sent to client 104 of user B confirming that user A added user B to his roster and queries user B as to whether user B would like to share basic or detailed presence with user A. If user B only shares basic presence, then user A can only see when user B is online or offline. However, if user B shares detailed presence with user A, then user A will see such full presence details.

TABLE 5

Simple and Full Presence

| Full Presence | Simple Presence | Description |
|---|---|---|
| Offline | Offline | User is offline, or has manually asserted that their presence is offline. If manually asserted, the user appears to be offline to all other users, but is actually logged in and can initiate conversations |
| Away | Offline | User has been away from their computer for more than Away Timer minutes, or user wishes to indicate that they are Away User can set their status to Away manually, or the system will assert Away on timeout. For clients on certain devices, such as BlackBerry, locking the screen puts the client in sleep mode and sets the presence status to Away |
| Idle | Available | User has been away from their computer for between Idle Timer and Away Timer minutes, or user wishes to indicate that they are idle. User can set their status to idle manually, or the system will assert idle on timeout of the Idle Timer |
| Available | Available | User is available |
| Busy | Offline | User is busy. For clients on certain devices, such as BlackBerry, if the user is on a voice call, the presence is automatically set to "busy" |
| Do not disturb | Offline | User has indicated that they are not to be disturbed |

As the system allows a user to have multiple simultaneous sessions 230, the user can be simultaneously logged in computer 104A in the office and mobile device 104B. Each instance of the user's clients 104 is identified by session, user agent, protocol, etc. The roster 250, inbox 260, conversations 202, threads 204, events/messages 206 and message status receipts 214 are automatically synchronized to all instances of the user's clients 104 (transient presence status, such as contact presence and event status, such as "... is typing" may not be propagated to a user's mobile device 104B when same device is in sleep or hibernate mode). For compliance and audit trail purposes, user actions are logged and tracked so that compliance officers can determine not only if and when a user received or read a message but also where and on what the device the message is received or read. The audit trail may contain device and user client information, such as IP address, user agent, device handset model, mobile device IMEI, system ID, and cell ID.

For each user 199, FE server 106 provides a single aggregate presence 234 for a user to clearly indicate the presence of that user. This is typically done instead of projecting different presence for each login session. The system determines a user's aggregate presence based on the user's explicit presence setting or through a priority ranking of the individual sessions. For example, if a user is active in three current sessions, with two of them having the status as Away and the third having the status as Busy, the system determines that the aggregate status is Busy. Table 6 shows the exemplary rankings.

TABLE 6

Priority of Presence States for Presence Aggregation

| Presence | Priority |
|---|---|
| Offline | 1 |
| Away | 2 |
| Idle | 3 |
| Available | 4 |
| Manually set: Busy, Do Not Disturb, Available, Idle, Offline, Away | 5 |

In an embodiment of the conversation model, a participant 220 is always in a conversation 202 and participates in a thread 204 unless the participant leaves the conversation, the conversation ended or the participant is involuntarily removed by a moderator. If a participant is removed from the conversation by the moderator, the participant has the role of outcast. An outcast is only allowed to rejoin a conversation if the user is re-invited back to the conversation by the moderator(s).

Table 7 shows a set of allowed user actions for participants with the various roles 222 within conversations. Also shown in Table 7 is the "ghost" 216 which is a participant granted with special privileges, which may be provided by the administrator. Typically, a compliance officer with "ghost" privileges has full visibility of all conversations within the administrative scope of a group of users of the service, but its presence is not announced to, or detected by, the other participants. This "ghost" participant can perform all actions as if the "ghost" is a conversation moderator. For instance, if the compliance officer as the "ghost" participant felt that the conversation involves participants with conflicting ethical interest in a conversation or if the participants in a conversation are exchanging messages that violate specific compliance rules, the "ghost" can enter a warning message or end the conversation entirely. In general, the actions of a ghost are invisible to the other participants unless the ghost wants the actions to be made known to the other participants.

TABLE 7

Allowed User Actions within Conversations.

| User Actions | Moderator | Member | Viewer | Outcast | Ghost |
|---|---|---|---|---|---|
| Can read messages in conversation | y | y | y | | y |
| Can write messages to conversation | y | y | | | y |

TABLE 7-continued

Allowed User Actions within Conversations.

| User Actions | Moderator | Member | Viewer | Outcast | Ghost |
|---|---|---|---|---|---|
| Can invite new participants to conversation | y | y | y | | y |
| Can kick out others from conversation | y | | | | y |
| Can end thread | y | y | | | y |
| Can change subject of conversation | y | y | | | y |
| Can view history of applicable thread | y | y | y | y | y |
| Can end the conversation | y | | | | y |
| Can view the participants in conversation | y | y | y | | y |
| Can view unread message counts in conversation | y | y | y | | y |
| Can modify the ACLS for conversation | y | | | | y |
| Can TRANSFER conversation to another desk | y | y | | | y |
| Can HOLD/RESUME a conversation | y | y | | | y |
| Can SEIZE/RELEASE a conversation | y | y | | | y |
| Can send INTERRUPT into conversation | y | y | | | y |
| Can invite others as cc to conversation | y | y | | | y |
| Can invite others as bcc to conversation* | y | y | | | y |

*bcc cannot invite or bcc others to conversation

Now, further details are provided on exemplary service features provided by an embodiment.

Figure 7:
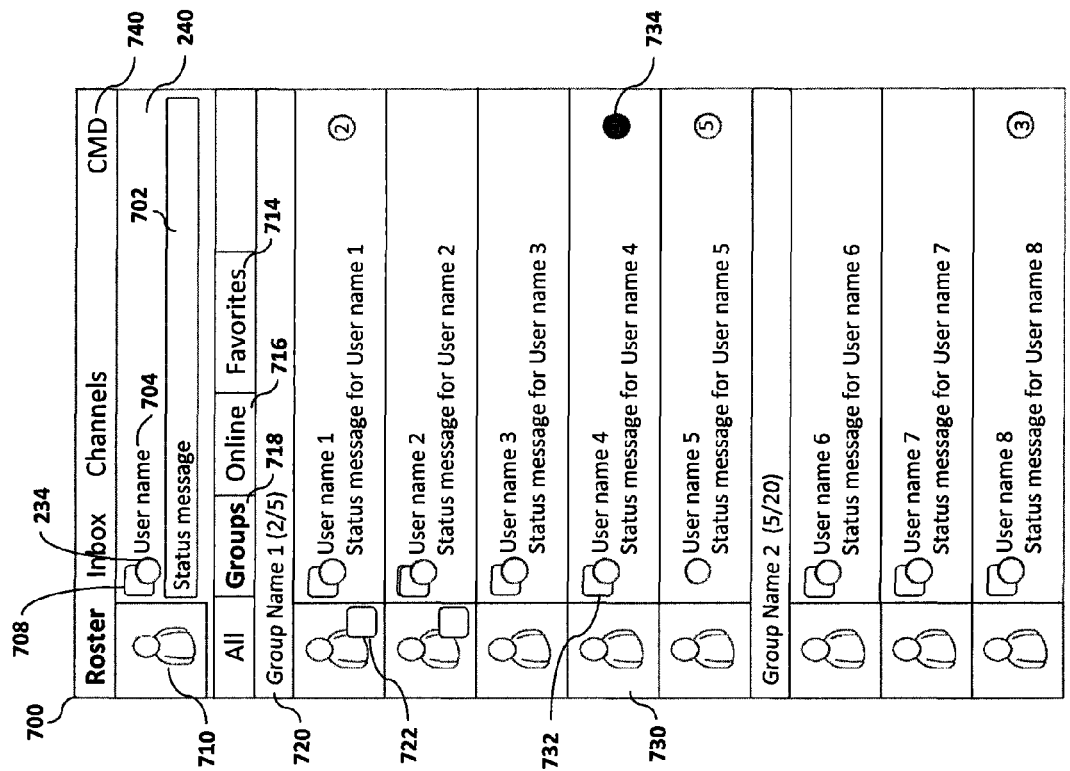
FIG. 7 is a block diagram of an exemplary graphical user interface (GUI) generated during the conversation according to an embodiment of FIG. 1.

FIG. 7 provides details on an embodiment of a roster user interface 700. Therein, a GUI of roster 250 shows a list of contacts 252 that user 199 may select to initiate conversations 202. A user can find other users in the system by searching the user directory in service manager 120, and then adding the contact into the user's roster. Contacts from the directory may not be added to a user's local roster if ethical wall rules prevent same. For example, a trader may be blocked from adding an analyst in the same firm to each other's roster. The directory entries and roster data can be set to be immutable. Alternatively, changes to the contact information and contacts in the roster on the client or server may be synchronized. Roster user interface 700 shows and provides the methods for the user to update user profile 240, such as user name 704, user presence status 234, avatar 710, which is part of the user profile 240, location status 708 and status message 702, which is part of user status 242.

In one embodiment, roster 700 may contain one or more bots which are autonomous client applications that perform automated functions. The bots in the roster are identified in a similar manner to contacts with a profile that may contain name and avatar. Unlike contacts which may be discovered in the user directory 120, bots may be discovered in the application store via the user portal 150. Bots may interact with users similar to human participants in a conversation and may provide functions, such as trading execution, asset pricing and transaction matching. Similar to conversation participants, a user may initiate a conversation with a bot on the user's roster via conversation interface 900 and may invite a bot into a conversation.

To help organize the contacts in the roster user interface 700, instead of showing "All" contacts, a filtered view of the contacts may be provided based on filtered user meta-tags, such as favorites 714, and contact presence status criteria, such as online 716. The contacts may be sorted as groups 718 which categorizes the contacts based on system meta-tags. Contacts in roster 250 as well as filtered views 714, 716, 718 on the roster user interface 700 may be further sorted by first name, last name, and company. For the contacts view sorted by groups, a specific group 720 may be defined with system meta-tags, such as "Brokers", and presented on the user interface with an appropriate label for dynamic data, such as the number of contacts online relative to the total number of contacts in that group. The system can distinguish between system tags, which are assigned to a user by an administrator and cannot be changed by a user, and user tags, which are assigned and controlled by a user to entries within their own roster. A user has full write control over his or her personal tags. Entries copied from the directory in service manager 120 to roster 250 retain any tags that are defined in the directory. For example, if a user copies the contact Fred from a Brokers group in the directory, Fred will appears in the Brokers group. With inheritance provisions, a user cannot remove or rename the Brokers system tag. As such, Fred will be permanently linked to show up in the Brokers group. However, a user can assign additional user tags to entries in their roster. For example, John may be assigned a Favorites tag. Then icon 722 on the roster user interface indicates that John is a favorite contact and John would appear in the favorites filtered view. Icon 722 may also denote the type of user contact, such as one using a Microsoft OCS (trademark) service that is federated through message hub 140.

As indicated in FIG. 7, the roster view 700 preferably show contact 730 with aggregated presence data 732 which is the aggregated presence 234 of: a contact, with location data (for example, office, travel, and home), an indication whether contact 730 is on a mobile device 104B and summary count 734 of the number of active conversations that involve the contact 730. For certain user devices, such as a desktop computer with a keyboard, it may be more efficient for the user to interact with the roster user interface 700 entirely using a keyboard rather than mouse or multi-touch input. For instance, the user, such as a typical equity trader in financial services may use CMD 740 to open a command input interface allowing the user to type a command, such as "Chat Warren" to start a conversation with Warren without using the mouse to navigate the contacts in the roster.

Figure 8:
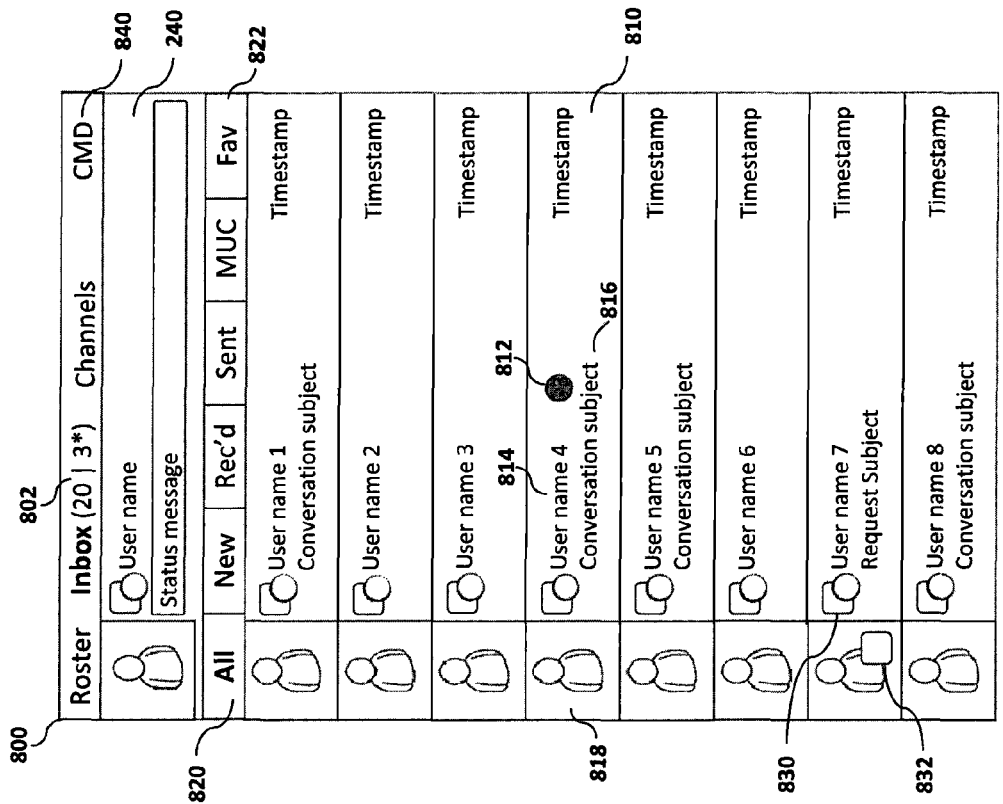
FIG. 8 is a block diagram of an exemplary GUI generated during the conversation of an inbox at a device according to an embodiment of FIG. 1.

FIG. 8 shows details of an embodiment of an inbox user interface 800 for managing the user's inbox 260. Inbox user interface 800 shows the active conversations for a user with user profile 240. Inbox 800 may show indications of the number of active conversations and the number of conversations with unread messages 802. Each active conversation 810 in the inbox 800 is an instance of the conversation 202. Inbox 800 may also present the active conversations and conversation invitations with filtered views 820, such as all, new (incoming conversation requests that has not yet been accepted or declined), queued (messages queued on client but not yet sent to transport), scheduled (conversations scheduled for delivery at a future date), received (conversations where the last message was received by the user), sent (conversations where the last message was sent by the user), one-to-one (conversations involving one or up to two participants excluding "bcc" participants), multi-party (conversations involving more than two participants), favorites (conversations that have been tagged as favorites) and recent (such as the most recent ten or so conversations that the user participated in). These filtered views 820 may be further sorted based on selected criteria, such as by date, subject, priority and flag.

Any conversation in Inbox 800 may be marked with tags, such as a favorite, which would make such conversation appear in "favorites" filtered view 822. An active conversation 810 in the inbox 800 can show the number of new messages 812 in conversation 810 with timestamp of the last incoming message. For any given active conversation 810, the interface can show for the conversation, name of the participant 814, conversation subject 816 and avatar information 818 of the participant 814. Additional information, such as contact vCard and status text of the participant 814 may be presented through the user interface.

Inbox 800 can also provide indications as to whether the participant of a given active conversation 810 is on a mobile device via the aggregated presence and location status icon 830, if a given entry is a conversation or a request for conversation. Other indicators, such as icon 832, may be provided, which may denote a particular user as a favorite contact or if the conversation is a favorite conversation. Icon 832 may also denote the type of conversation, such as one with a contact using the Microsoft OCS (trademark) service that is federated through message hub 140. Each conversation in inbox 800 may be color coded based on certain criteria, such as the type of participants in the conversation, such as the traders and research analyst, specific conversation subject, conversation priority and flag and whether the participants involve just internal co-workers or may involve customers.

For certain user devices, such as a desktop computer with a keyboard, it may be more efficient for user to interact with inbox 800 using a keyboard rather than mouse or multi-touch input. The user may use CMD 840 to open a command input interface allowing the user to type a command, such as "open 5" to open up the fifth conversation on the inbox or "fav" to open up the filtered list of conversations marked as favorites. The inbox 800 may show a summary of active conversations or as constrained by device memory and computing resources and retrieve or sync the conversation threads and messages from FE server 106 as needed by the user. Details of the conversation may be retrieved from message store 108 or from the archived conversations from the message archive 130.

Figure 9:
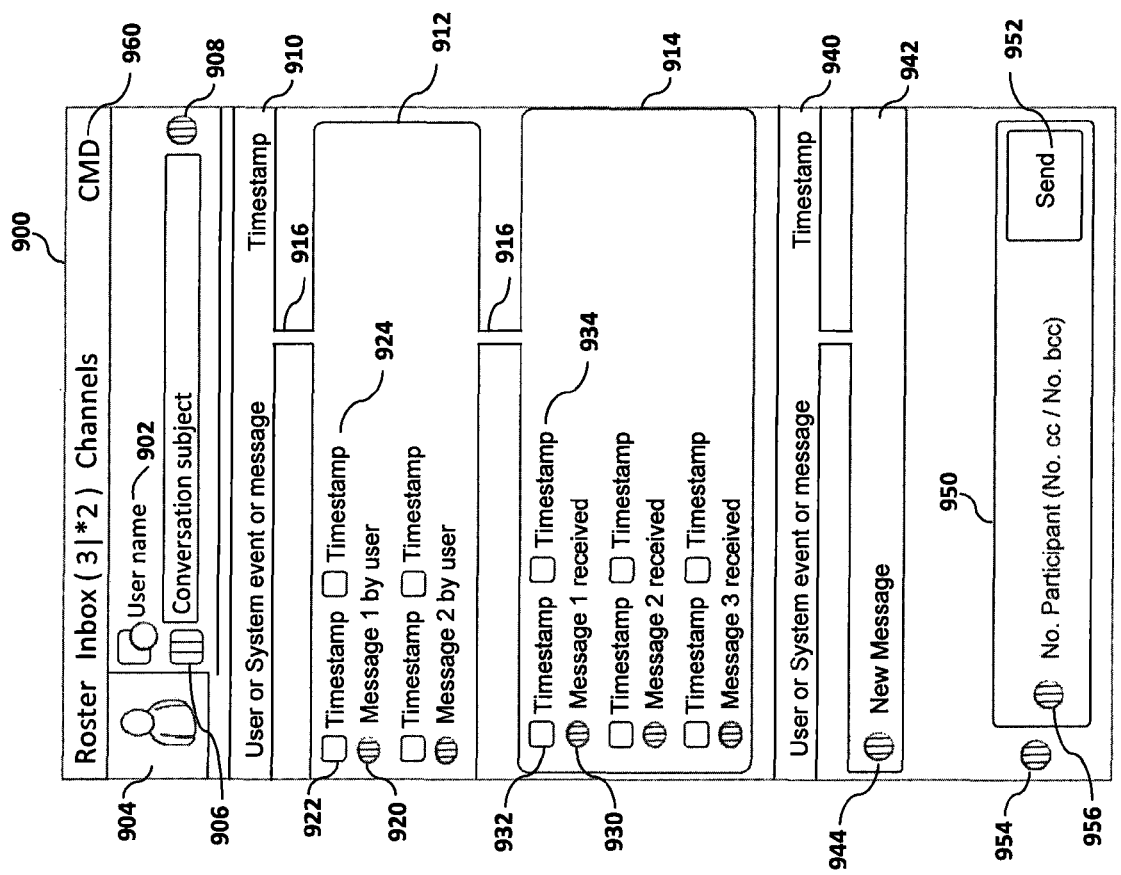
FIG. 9 is a block diagram of an exemplary GUI for a chat interface generated during the conversation according to an embodiment of FIG. 1.

Turning to FIG. 9, further details are now provided on conversation dynamics of an embodiment. The originating user starts a conversation 202 on the conversation user interface 900 by entering the first message with an optional subject as well as optional conversation priority and flag. The originating user can also specify the invited participant 220 with a correspondence context 224, such as a "to", "cc", or "bcc", and assign the invited participant a role 222, such as "moderator", "member", or "viewer". When adding or inviting participants into a conversation, the active participants are listed in the "to" field; passive participants are listed in the "carbon copy" "cc" field; and silent participants are listed in the "blind carbon copy" "bcc" field. After the conversation invitation is sent, the invited users will see a request message in their inboxes. Upon opening the conversation invitation request, the recipient users have the option to open/accept or ignore the conversation. If a recipient user ignores the conversation, the conversation is rejected and an appropriate message is passed back to originating user. If the conversation request is accepted by a recipient user, the user and the participant then are allowed to converse in a message thread.

Through federating facilities via message hub 140, participants can communicate with SIP-based networks, such as OCS and Thomson Reuters messaging, and XMPP networks, such as Jabber and GoogleTalk (trade-marks). Variants in the participant types are handled through the roster user interface 700, variants in the conversation types are handled through the inbox user interface 800, and exception handling for the conversation involving participants of multiple services domains are handled in the conversation interface 900. For instance, if the contact is on OCS, restrictions mandate that the user cannot send a message to the OCS contact while the contact is offline, the user cannot be part of a multi-user conversation and messages sent to the online OCS contact will have corresponding "200 OK", but not actual "read" status receipts against each message. Further, for OCS contacts an OCS client cannot send "accept" on conversation invites from the users. In such cases, FE server 106 acts as a "proxy" which "accepts" the conversation invite on behalf of the OCS client as well as the user client.

In one embodiment, as a compliant messaging system, one-to-one conversations are declared private and conversation history is not shared. For multi-party conversations, the system facilities sharing conversation history based on conversation threads. When participants are added to a multi-party conversation in progress, the inviter may choose to share the current message thread with the new participants. The new participants can scroll back in the conversation history and see all of the messages back to when the message thread began. If an inviter decides to share the current message thread, the active message thread is retained as active, the new participants are added to the conversation, the new participants can scroll back to whenever the message thread started and the current participants are told that the new participants are able to see the entire message thread. If the inviter decides not to share the current message thread, the current message thread ends, a new thread starts, the new participant is added to the conversation, the new participants can scroll back only to when they were added to the conversation and the current participants are informed that the new participant joined the conversation.

FIG. 9 details an embodiment of a conversation user interface 900 for sending and receiving message in a conversation. Referencing the conversation user data model 200, conversation user interface 900 shows other participant's name 902, presence status and location meta-data and participant's user profile data, which may include avatar data 904. For multi-party conversation, a generic multi-party avatar image might be used, and only the name of first participant 902 on the current participant list is shown. In one embodiment, clicking or tapping onto avatar 904 may bring up a user interface to show the list of current participants along with the role of each participant and the correspondence context of each participant ("to", "cc", "bcc") in the conversation. The conversation interface 900 may also show the shared conversation subject, the shared conversation priority which may be indicated by icon 906, and a user defined non-shared conversation flag which may be indicated by icon 908. Some of these settings, such as the priority may only be set by the moderator. Further, only the participant that invited a given "bcc" a participant can see that "bcc" participant in the conversation's current participant list.

As an illustration of how active and closed threads are handled in conversation user interface 900, a conversation may contain a closed thread 910 and an active thread 940. In this example, closed thread 910 may contain a set of messages 912 sent by the user and a set of messages 914 received by the user in the conversation. For closed thread 910, message bundles 912 and 914 may be visually linked as being in the same thread via visual elements 916. For an outgoing message 920 sent by the user, the interface may show an icon indicating the message status receipt (such as pending, delivered, or read) with a timestamp 922 indicating the time the message was sent. After outgoing message 920 from the user is read by the recipient participant, the interface may show timestamp 924 indicating the time the message was read by the recipient participant. For an incoming message 930 received by the user, the interface may show an icon indicating the message status receipt with timestamp 932 indicating the time the message was originally sent and received on FE server 106, as well a timestamp 934 indicating the time that the message was read by the user. In terms of the handling for active thread 940, interface 900 may show latest message 942 with icon 944 that reflects the current status receipt (such as pending, delivered, and read) of message 942.

To allow the user to compose and send messages, conversation interface 900 provides a message entry field 950 along with action buttons for send 952, smiley, and file transfer. Within the message entry field 950, there may be grey text (auto dismiss once the user start typing a message) to indicate the total number of participants (excluding bcc) along with the total number of cc participants and the number of participants that are sent "bcc" messages by the user. Further, icon 956 may be provided within the message entry field 950 indicating the correspondence context of the user in the conversation interface 900. Icon 956 provides visual indication that if the user has correspondence context of "cc" or "bcc", then the user is expected to exercise appropriate discretion before participating in the conversation. To send a message to the participants in the conversation, the user simply enters the message within the entry field 950 and invokes "Send" 952. To provide visual indication of the user's role in the conversation, icon 954 will show whether the user is moderator, member or viewer. If the user is a viewer, the message entry field 950 is disabled to prevent the user from enter messages into the conversation.

To provide additional conversation context to the user, conversation interface 900 with specific messages in a conversation thread may be color coded based on certain criteria, such as the job function of the participant, such as trader or research analyst, or the corporate affiliation of the participant, such as someone within the same company or someone that may work for a customer or competitor.

In one embodiment, conversation interface 900 allows the user to toggle between conversation mode and embedded bot command mode. When in conversation mode, the user may leave the message entry field 950 empty and click "Send" button 952 which turns the message entry field 950 into a command entry field and changes the conversation interface into an embedded bot command mode. In an embedded command mode, the user may interact with embedded bots which provide autonomous functions to the user. Exemplary embedded commands include "CALC 1234*4321" to perform a mathematical task, "TICKER MSFT, AAPL" to get a real time stock quote, or "WHOIS john.smith" to get a vCard profile of a user "John Smith". When in embedded command mode, the user may leave command entry field 950 empty and click "Send" button 952 which turns the command entry field back into a message entry field and resume the normal conversation mode. Visual indicator 954 is beside message entry field 950 and shows a command mode icon when in embedded command bot mode.

Other than user messages, conversation interface 900 also show system and user events 910, 940, such as subject change, thread closed, participant joining, and participant leaving the conversation. The system and user events are shown with the time and date when such event occurred. The user messages along with user and system events may be shown within demarcated threads 910, 940 using visual elements, such as link icons 916 to show the association of an event to a thread. These demarcated conversation threads may be visually expanded and collapsed. Each conversation thread may be shown with meta and header summary information, such as start and end times of the thread, the number of messages in the thread, the number of attachments, the number participants of in the conversation thread, the subject associated with the thread, message tags, thread conversation summary text, meta tags, etc.

For enhanced user experience, conversation interface 900 may present absolute and relative timestamps for the messages and events. For an incoming message 930 received by the user, the user may select to view the absolute time when the message was received by the system and the time when the message was read by the user. The user may also toggle the view to see the relative time (e.g. 2.5 hours ago) instead of the absolute time (e.g. Jan. 1, 2011 5:15:22 AM). For each outgoing message 920 created and sent by the user, the user may select to view the absolute time when the message was sent and the time of the message's latest status. Similarly, the user may toggle to view the outgoing messages created by the user as relative time rather than absolute time.

The conversation interface 900 allows the user to easily navigate to other recent active or favorite conversations, and to create new conversations. Further, the conversation interface provides the contextual menu for user actions, depending on user permission, that allow the user to change the subject, invite a participant, end the thread, or end the conversation. For certain user devices, such as a desktop computer with a keyboard, it may be more efficient for user to interact with the conversation messaging interface entirely using a keyboard rather than mouse or multi-touch input. The user may use CMD 960 to open a command input interface allowing the user to type a command, such as "subject market volatility" to change the subject to "market volatility", "part" to open the interface to view the list of current participants associated with the conversation, or "invite John" to open a pick list of roster contacts with the name "John".

Figure 10:
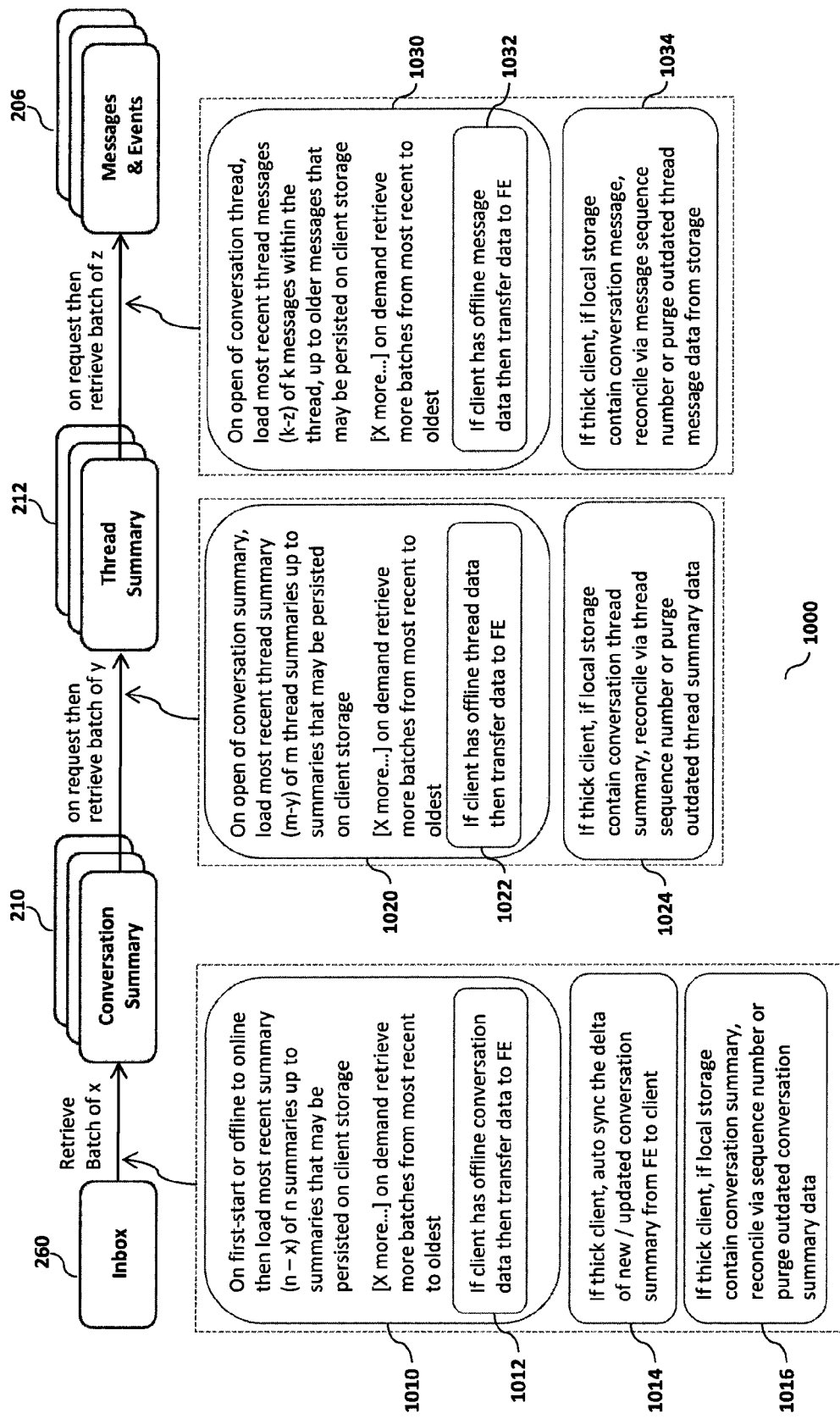
FIG. 10 is a block diagram of accessing and synchronization of conversation between the user client and the server according to an embodiment of FIG. 1.

Referring to FIG. 10, details of viewing and accessing a conversation message from a user interface are provided. Also synchronization features of conversation data between client 104 and FE server 106 is provided. A layered structure of the conversation summary, the associated thread summary and the associated messages in each thread provides an efficient exchange of data between client 104 and server 106 and also provides efficient partitioning of each message thread within the conversation for message archiving and compliance controls. To provide improved user experience for thick clients, a portion of the conversation thread summary with portions of the conversation message data associated with the conversation thread may be pre-fetched from FE server 106 to client 104 on device 1046 so that the data may be presented to the user instantaneously on a user's request.

With reference to the conversation user data model 200, when client 104 first loads the inbox data, client 104 retrieves via process 1010 a batch of "x" conversation summary of conversations "n" to "n–x" of "n" conversations that may be optionally based on certain filtered criteria from FE server 106 into inbox interface 800. For a thick client that can store conversation data in local storage, that client retrieves the recent conversation summary up to the older conversation data that is already persisted on the client device storage. If the user wants to retrieve the summary of older conversations, the user may request the client to retrieve additional conversation summary from FE server 106. For a thick client that has conversation summary data that was composed in an offline mode, the client can upload the offline mode conversation summary data to FE server 106 via process 1012, which then reconciles the conversation summary according to state transitions 500 and pushes the reconciled data to all applicable sessions of the user's client 104 and recipients of the conversation data. For instance, if the offline conversation summary data relate to a conversation that have since ended, the user will be prompted with the option to create a new conversation with the same participants using the conversation data that was composed in offline mode.

For a thick client that can store conversation summary in local storage, delta synchronization is used via process 1014 to only transfer the changes between the client and server to minimize bandwidth and battery usage. If the thick client contains outdated conversation summary in its persistence storage, the conversation summary on the client will be reconciled as part of the delta synchronization process or purged from its local storage via process 1016.

From the Inbox interface 800, a user may open a conversation summary via process 1020 to retrieve a batch of "y" conversation thread summary 212 of conversation threads "m" to "m−y" of "m" conversation threads of the selected conversation from FE server 106 into a the conversation interface 900. If the user wants to retrieve the summary of older conversation threads, the user may request the client to retrieve additional conversation thread summary from FE server 106. For a thick client that has a persisted view of the conversation thread summaries, rather than retrieving in reverse order starting from the most recent conversation thread summary, the client may present the conversation thread summary from the position that was last viewed by the user. For a thick client that contains a conversation thread summary that was composed in offline mode, the client uploads the offline mode conversation thread summary data to FE server 106 via process 1022, which then reconciles the thread summary data according to state transitions 500, and pushes the reconciled data to all applicable sessions of the user's client 104 and recipients of the conversation thread data. For instance, if the offline conversation thread data relate to a conversation thread that was already closed, but the conversation is still active, the conversation data can be inserted into the latest active thread, or if no active thread exists, the offline conversation data can be inserted into a new conversation thread. If the thick client contains outdated conversation thread summary in its persistence storage, the conversation thread summary on the client can be reconciled as part of the delta synchronization process or purged from its local storage via process 1024.

From conversation interface 900, the user may open a conversation thread via process 1030 to retrieve a batch of "z" conversation messages 206 of messages "k" to "k−z" of "k" messages of the selected conversation thread from FE server 106 into the conversation interface. If the user wants to retrieve the older messages within the thread, the user may request the client to retrieve additional messages and events associated with the thread from FE server 106. For a thick client that has a persisted view of the conversation messages, rather than retrieving in reverse order starting from the most recent conversation message, the client may present the conversation message data from the position in the message data that was last viewed by the user. For a thick client that contains persisted conversation message data that was composed in offline mode, the client uploads the offline mode conversation message data to FE server 106 via process 1032, which then reconciles the conversation message data according to state transitions 500 and pushes the reconciled data to all applicable sessions of the user's client 104.

For instance, if the same conversation thread is still active, the offline conversation messages associated with the thread may be inserted into the tail of the thread, but with reference indicators indicating that the message contextually refers to a prior message within the conversation thread. If the thick client contains outdated conversation message data in its persistence storage, the conversation message data on the client will be reconciled as part of the delta synchronization process or purged from its local storage via process 1034.

Figure 11:
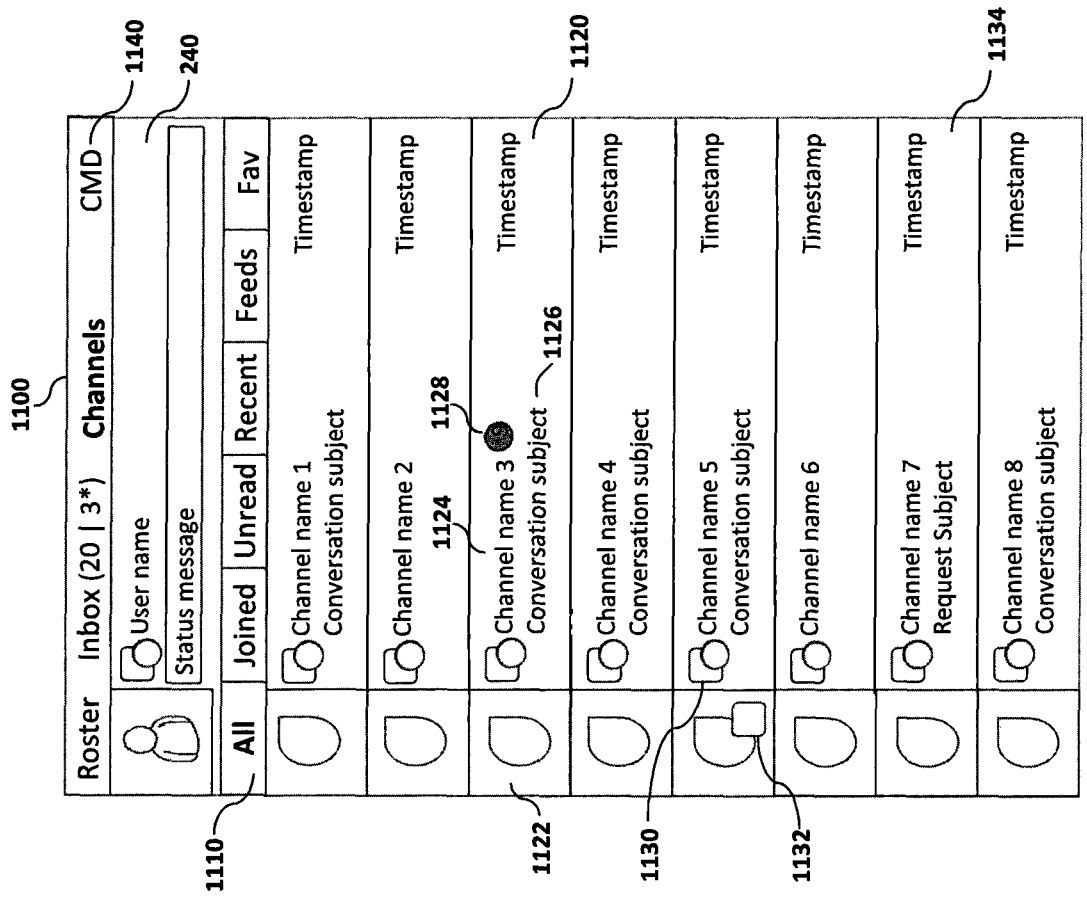
FIG. 11 is a block diagram of an exemplary GUI for conversation channels generated during the conversation according to an embodiment of FIG. 1.

Turning to FIG. 11, further details are now provided on conversation channels that are persistent conversations that user 199 with the required access rights may join to become a participant of the conversation channel. Conversation channels are based on conversation model 200 and are provisioned by service manager 120 and made accessible to user 199 via FE server 106. The user access policy including the administration of ethical rules via service manager 120 and the enforcement of the policy via FE server 106 relating to conversation channels messaging compliance are provided in separate disclosure.

In one embodiment, user 199 with user profile 240 accesses the conversation channels via user interface 1100. All of the authorized conversation channels provisioned for the user may be accessed via the "All" 1100 conversation channel filter, which may be further sorted, such as by date of last update. Additional filters may be provided to simplify the user interface including "Joined" which filters the conversation channels that the user has already joined as a participant, "Unread" which filters conversation channels in which is participant and contain messages unread by the user, "Recent" which filters recently added conversation channels which may be of interest to the user, "Feeds" which filters a view-only conversation channels that are data or message feeds where the user's role is a "viewer", and "Favorite" which filters conversation channels which the user have tagged as favorite.

Each conversation channel 1120 available to the user may be presented with the name of the channel 1124 along with the subject 1126 of the active conversation thread and a timestamp indicating last update. In addition, the channel may be presented with an avatar 1122 defined for the conversation channel and an indicator 1128 that shows the number of participants associated with the conversation channel. In one embodiment, additional information relating to the conversation channel, such as the channel profile, list of active participants, participants within the channel, shared meta-data relating to the channel, user private meta-data relating to the channel and system meta-data relating to the channel may be provided by clicking on avatar 1122 of the conversation channel.

For conversation channels, interface 1100 can also provide indicators 1130 which can indicate the status of a conversation channel, such as the channel placed on "hold" by a participant or a participant sent an "interrupt" to mark the channel conversation. Other indicators, such as icon 1132 may be provided, which may denote a particular conversation channel as a favorite channel. Existing participants of a conversation channel may also invite new participants into the conversation. Invitation to conversation channels 1134 appear in both inbox interface 800 as well as conversation channel interface 1100. For certain user devices, such as a desktop computer with a keyboard, it may be more efficient for user to interact with conversation channels using a keyboard rather than mouse or multi-touch input. The user may use CMD 1140 to open a command input interface allowing the user to type a command, such as "fav" to open up the filtered list of channel conversations marked as favorites, or "search Swiss franc" which may search for all conversation channels relating to Swiss Franc currency.

Now, further details are provided on the compliance archiving of the message threads by an embodiment.

Each message thread in the conversation facilitates end-to-end message archive reconciliation and can be stored in a compliance archive, such as message archive 130. To ensure messaging compliance, message archive 130 or an equivalent external message archive is used to record conversations and any subsequent accesses to those conversations. Message archive 130 can provide adherence to regulatory requirements for electronic recordkeeping, such as SEC Rule 17a-4, NASD Conduct Rule 3110, NYSE Rule 440, and requirements for any Investment Advisors and Hedge Funds in the firm under SEC Rule 204-2. Further, message archive 130 provides an auditable, evidentiary-quality copy of each message as created, which is then indexed, serialized and time/date stamped, which can be stored for extended periods of time that meets regulatory requirements. The copy can be searched, recovered, or exported as needed by a compliance officer.

In one embodiment, message store 108 stores the user's active conversations and closed threads for a set period of time (e.g. up to thirty days) for the purpose of providing faster response to user conversation and thread data access. All message threads of ended conversations as well as closed threads of active conversations are routed for archive storage by FE server 106 to message archive 130 or an external archive via the message converter. Configurable by the system, blocks of messages within active threads may also be routed by FE server 106 to message archive 130 for archive storage. Whenever blocks of messages are archived while a thread is still active, a system event is generated for end-to-end message archive reconciliation. It will be appreciated that message store 108 may also act as the long term message store for all conversation messages but interface through the message archive 130 for message flagging and various message compliance supervisory, e-discovery, and audit functions.

Figure 12:
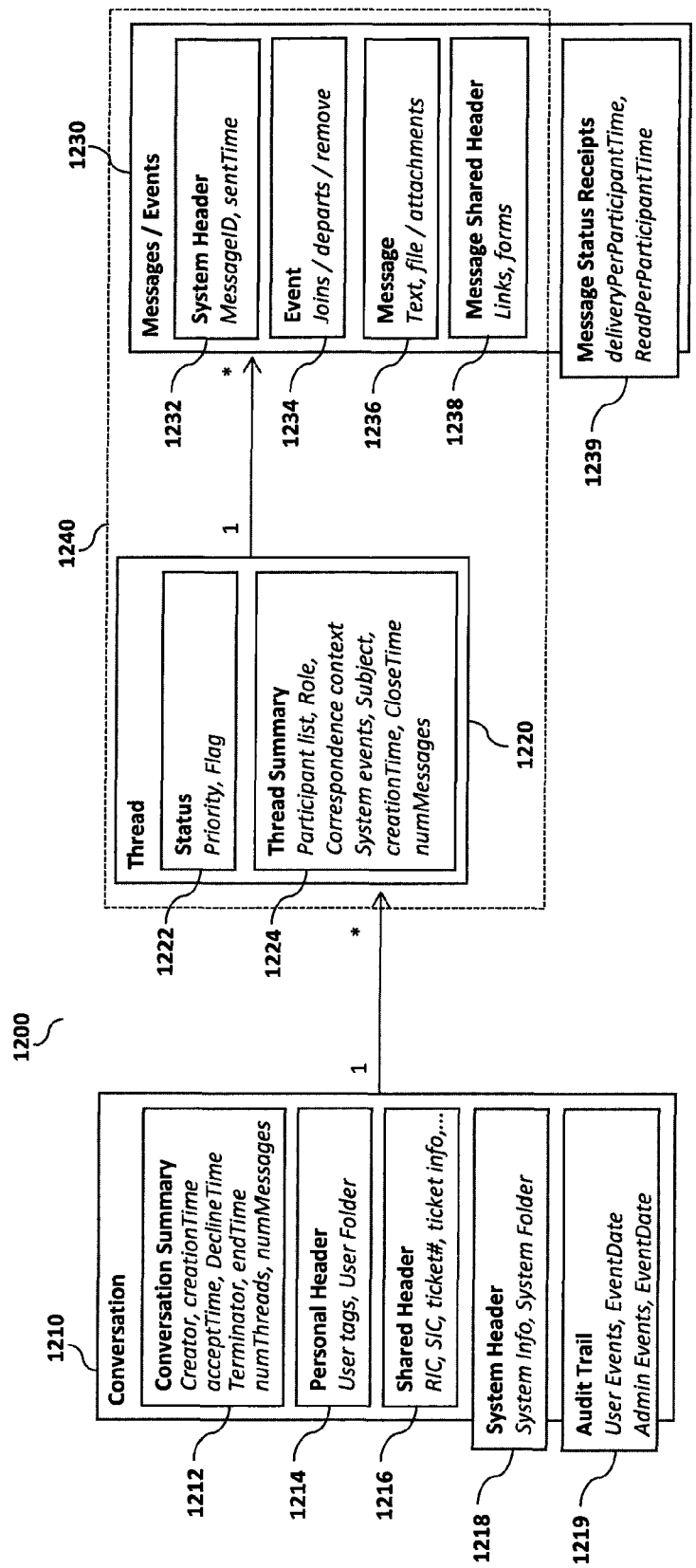
FIG. 12 is a block diagram of an exemplary conversation archiving model for compliance archiving of messages according to an embodiment of FIG. 1.

FIG. 12 is an exemplary illustration of how a message thread may be bundled and stored in the compliant message archive. Referencing conversation user data model 200 of FIG. 2, FIG. 12 shows a message thread 1220 with its associated set of messages and events 1230 for a conversation 1210. Each thread 1220 along with its associated messages and events 1230 can be viewed as an archival message unit 1240, which can be routed for external delivery or stored in the compliant message archive 130. The archival message unit 1240 containing the thread data 1220 may be stored with the status 1222 (containing the priority, and flag, etc.) and summary 1224 (containing the participant list, user's role, user's correspondence context, such as "to", "cc" or "bcc", system events, such as closing of thread due to no user activity after a certain period of time, thread subject, the thread creation and close time, and the number of messages in the thread). The archival message unit 1240 containing the message and event data 1230 may be stored with the system header 1232 (containing the messageID, sent time, etc.) and the event 1234 (such as participant joins, departs and removes) or message 1236 (message text, files and attachments) with an optional message shared header 1238 (containing links, forms, etc.). The names of the participants, including those in a distribution list or desk in the archival message unit, are based on the participant's correspondence context.

For compliant message archiving, conversation data 1210 is preferably stored with the summary 1212 (such as creator of the conversation, conversation creation and end time, invitation accept or decline time, number of threads in the conversation, etc.), personal header 1214 (containing user folder, user tags, etc.) and shared header 1216 which provide metadata shared by participants (containing information, such as RIC or SIC codes, support ticket number, support ticket information, such as name and contact info, etc.) with references linking the conversation 1210 to its threads 1220. Through inbox interface 800, conversation interface 900 or conversation channel interface 1100, the user may also request the system to email the archival message unit to one or more of the participants in the conversation thread or to external email accounts. For simplicity, non-conversation events, such as change of the user status, user session sign-in and sign-off, and profile change are logged by FE server 106 and stored the message archive 130 but not shown in FIG. 12.

In one embodiment, each of the archival message units is stored in the message archive 130 in the indexed shared archive for fast search and a copy of the archival message unit is stored for each enterprise and "bcc" user. For example, if a conversation thread involves participants belonging to X enterprises needing compliance archive storage within message archive 130 and there are Y "bcc" participants in the conversation thread, then message archive 130 stores a copy in the indexed shared searchable archive, one copy into each of the X enterprise compliance archive and a further copy into each of the Y participants. This allows each of the X enterprises to search, access and export their own copy of the archival message unit for legal compliance purposes. Also each of the Y "bcc" users only sees a filtered copy of the archival message unit without other "bcc" participants on the list.

The archival message unit 1240 includes the thread and message text with attachments are immutable once received by FE server 106 but the status receipts 1239 associated with each message 1136 may still change even after the thread is closed or the conversation ended and after the message is stored in the message archive 130. As such, mutable data elements, such as the message status receipt are stored in a mutable dynamic data store module of message archive 130. When a user access the archived message 1236 from client 104, the message status receipt is updated accordingly (for example, from pending to delivered and read). If the user accesses the archived message from a different client, such as from a message archive interface, the user action is logged as part of the audit trail 1219 associated with the conversation in the message archive. Mutable data, such as conversation system folder in the system header 1218, and audit trail, such as user or compliance officer access, are preferably stored in the dynamic data store of the message archive 130. In general, mutable data are non-static aspects of the message, which includes message status receipts and message meta-data, such as message folder, message access trail, message retention period, client attorney privilege, compliance review flags, etc.

The various features described above may be implemented in, and fully automated by code modules executed by general-purpose computing devices, including but not limited to data center servers, PCs and mobile phones. The code modules may be stored in any type or types of computer storage device or memory. It should be understood that the various steps may alternatively be implemented in-whole or in-part within specially designed hardware.

It will be appreciated that all modules described herein for client 104, server 106 and other modules in the embodiments can be implemented using known programming techniques, languages and algorithms. Although the modules described are implemented in client 104 and server 106, it will be appreciated that some functions of the modules may be provided in a separate server that is in communication with clients 104 and/or server 106. The titles of the modules are provided as a convenience to provide labels and assign functions to certain modules. It is not required that each module perform only its functions as described above. As such, specific functionalities for each application may be moved between modules or separated into different modules. Modules may be contained within other modules. Different signaling techniques may be used to communicate information between applications using known programming techniques. Known data storage, access and update algorithms allow data to be shared between applications. It will further be appreciated that other applications and systems on client 104 may be executing concurrently with other modules. As such, any of modules (or parts thereof) may be structured to operate in as a "background" application on client 104 and server 106, respectively, using programming techniques known in the art.

It will be appreciated that the embodiments relating to clients, servers, services, state machines and systems may be implemented in a combination of electronic hardware, firmware and software. The firmware and software may be implemented as a series of processes, applications and/or modules that provide the functionalities described herein. The algorithms and processes described herein may be executed in different order(s). Interrupt routines may be used. Data may be stored in volatile and non-volatile devices described herein and may be updated by the hardware, firmware and/or software.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

Although this disclosure has been described in terms of certain embodiments and applications, other embodiments and applications that are apparent to those of ordinary skill in the art, including embodiments which do not provide all of the features and advantages set forth herein, are also within the scope of this disclosure. Accordingly, the scope of the present disclosure is intended to be defined only by reference to the following claims.

The invention claimed is:

1. A method for processing messages sent from a client in a network, the method comprising:
    for a message for a conversation to be transmitted from a client associated with a first user account of a plurality of user accounts associated with the network to a set of user accounts of the plurality of user accounts, upon activation of a command to send the message, sending to the set of user accounts a request message requesting acceptance of the conversation;
    receiving replies from the set of user accounts to the request message;
    sending the message for the conversation to a first subset of accounts associated with the set of user accounts that generated an acceptance message for the request message and updating a message log associated with the conversation to indicate that the first subset of accounts has accepted the conversation as participants in the conversation;
    associating a message thread with the message for the conversation and the participants, where responses to the message from the participants are included in the message thread;
    closing the message thread when one of the participants indicates that it is no longer participating in the message thread; and
    creating a new message thread for a set of remaining participants in the conversation.

2. The method of claim 1, further comprising:
    updating the message log to indicate that a second subset of accounts associated with the set of user accounts that refused or did not respond to the request message has not been sent the message.

3. The method of claim 1, further comprising:
    associating a second message thread with the message for the conversation and the participants, where responses to the message from the participants are included in the second message thread; and
    initiating a third message thread associated with the conversation when one participant of the participants forwards another message in the conversation to a new user account of the plurality of user accounts that is participating in the conversation, the third message thread including the new user account once the new user account accepts an invitation to the conversation.

4. The method of claim 3, further comprising:
    closing the second message thread when one of the participants indicates that it is no longer participating in the second message thread.

5. The method of claim 3, further comprising:
    creating a fourth new message thread for a set of remaining participants in the conversation.

6. The method of claim 1, further comprising:
    assigning the first user account with a moderator role, having authority to end the conversation, remove a participant of the participants from the conversation and change a role of another participant in the conversation;
    assigning an account of another participant of the participants one of
        a ghost reviewer with a moderator role, having authority to revoke the moderator role from the first user account and to send a warning message to any of the participants determined to have a compliance violation;
        a member role having authority to at least write messages, change thread subject, transfer conversations and hold and resume conversations; and
        a viewer role, having viewing restrictions on at least one of the messages, a list of the participants and a message thread history.

7. The method of claim 1, further comprising:
    assigning an account of a participant of the participants identified in a "send to" field for the message as a contributor to the message thread;
    assigning an account of a second participant of the participants identified in a "send cc" field for the message as a passive contributor to the message thread; and
    assigning an account of a third participant of the participants identified in a "send bcc" field for the message as an invisible contributor to the message thread that cannot invite or initiate sending of blind copy of a message to other user accounts to the conversation.

8. The method of claim 1, further comprising:
closing the message thread and ending the conversation when either a command to end the conversation is issued by the first user or all participants have left the conversation.

9. The method of claim 1, further comprising:
transferring the conversation to an account of the plurality of user accounts outside the participants upon issuance of a transfer command from the first user account.

10. The method of claim 1, further comprising at least one of:
placing a hold on the message thread upon issuance of a hold command from the first user account, where new messages cannot be submitted to the message thread until the hold is removed;
interrupting the message thread upon issuance of a mark command from the first user account, where a new message from the first user account is provided at the mark point in the message thread;
seizing the message thread upon issuance of a seize command from the first user account, where the participants having only viewer role until the seized message thread is released by the first user account;
merging the message thread with a second message thread of a second conversation into a third message thread for a third conversation involving participants of the first and second conversations; and
splitting the conversation into first and second parts with a first subset of the participants assigned to the first part and a second subset of the participants assigned to the second part.

11. The method of claim 1, further comprising:
for each account of the first subset of accounts, maintaining message status data relating to the each account and updating the message status data to indicate whether the message has been:
received by the network;
received by the each account; and
opened by the each account.

12. The method of claim 1, further comprising:
tracking the conversation in a conversation channel, the conversation channel being discoverable by one of the plurality of accounts; and
where participant roles may be selectively set for the conversation channel to implement social communications such as greeting, walls, feed publishers and feed aggregators.

13. The method of claim 1, further comprising:
specifying a time-to-live time for the conversation indicating a deadline for acceptance of the request message, wherein
if an account of the first subset of accounts accepts the message prior to the time-to-live time, the account is designated as a participant in the conversation; and
if the account accepts the message after the time-to-live time, the account is not permitted to participate in the conversation.

14. The method of claim 1, further comprising:
providing the message to the participants as either a plurality of one-to-one conversations, a plurality of multiparty conversations, a plurality of blast conversations, or a plurality of broadcast conversations.

15. The method of claim 1, further comprising:
providing access to the first user account through a second client in the network while maintaining access to the first user account through the client;
when the second client reconnects to the network after being disconnected from the network, reconciling any queued actions for the conversation, the message thread and the messages stored at the second client against a current state of the conversation, the message thread and the messages;
re-synchronizing the second client to the current state of the message conversation, the message thread and the messages;
updating a first status indicator in the message log with details whether the message has been sent from the second client; and
updating a second status indicator in the message log with details whether the message has been received or opened by the second client,
wherein the second client is a mobile device.

16. The method of claim 1, further comprising:
forwarding the message to an outside account of the plurality of accounts that is not in the first subset of accounts while a share conversation status is maintained for the outside account,
wherein:
the outside account is a contact in a roster associated with the first user account; and
messages within the conversation submitted by outside user account are formatted to appear to be submitted by the first user account or by the outside account on behalf of first user account.

17. A server for processing messages sent from a client in a network, the server comprising:
a processor;
a memory device containing
instructions for execution on the processor to enable the processor to
send a message for a conversation to be transmitted from a client associated with a first user account of a plurality of user accounts associated with the network to a set of user accounts of the plurality of user accounts upon activation of a command to send the message;
send to the set of user accounts a request message requesting acceptance of the conversation;
receive replies from the set of user accounts to the request message;
send the message for the conversation to a first subset of accounts associated with the set of user accounts that generated an acceptance message for the request message;
update a message log associated with the conversation to indicate that the first subset of accounts has accepted the conversation as participants in the conversation;
associate a message thread with the message for the conversation and the participants, where responses to the message from the participants are included in the message thread;
close the message thread when one of the participants indicates that it is no longer participating in the message thread; and
create a new message thread for a set of remaining participants in the conversation.

18. The server for processing messages sent from a client in a network, as claimed in claim 17, further comprising:
a message archive server that assembles and stores data of an archive message unit for the conversation, the data comprising the message thread and messages associated with the conversation in a storage system, wherein for the conversation, the data comprises summary data, system header data and personal header data.

19. The server for processing messages sent from a client in a network, as claimed in claim 18, wherein the message archive server further:
- updates the message log when the client accesses the data of the archive message unit.

20. The server for processing messages sent from a client in a network, as claimed in claim 18, wherein the memory device contains further instructions for execution on the processor to enable the processor to
- update the message log to indicate that a second subset of accounts associated with the set of user accounts that refused or did not respond to the request message has not been sent message for the conversation.

* * * * *